(12) United States Patent
Pan et al.

(10) Patent No.: US 12,518,438 B2
(45) Date of Patent: Jan. 6, 2026

(54) CUSTOMIZING GENERATION OF OBJECTS USING DIFFUSION MODELS

(71) Applicant: Lemon Inc., Grand Cayman (KY)

(72) Inventors: Jiachun Pan, Singapore (SG); Hanshu Yan, Singapore (SG); Jiashi Feng, Singapore (SG); Jun Hao Liew, Singapore (SG)

(73) Assignee: Lemon Inc., Grand Cayman (KY)

( * ) Notice: Subject to any disclaimer, the term of this patent is extended or adjusted under 35 U.S.C. 154(b) by 239 days.

(21) Appl. No.: 18/347,366

(22) Filed: Jul. 5, 2023

(65) Prior Publication Data

US 2025/0014233 A1    Jan. 9, 2025

(51) Int. Cl.
*G06T 11/00*    (2006.01)
*G06T 5/70*    (2024.01)

(52) U.S. Cl.
CPC ............... *G06T 11/00* (2013.01); *G06T 5/70* (2024.01); *G06T 2207/20081* (2013.01); *G06T 2207/20084* (2013.01)

(58) Field of Classification Search
CPC . G06T 11/00; G06T 5/70; G06T 2207/20081; G06T 2207/20084; G06V 10/764; G06N 3/0464; G06N 3/084
USPC ........................................................ 345/418
See application file for complete search history.

(56) References Cited

U.S. PATENT DOCUMENTS

| | | | |
|---|---|---|---|
| 9,942,572 B2* | 4/2018 | Puri | H04N 19/85 |
| 12,262,056 B2* | 3/2025 | Shima | H04N 19/119 |
| 2022/0092728 A1* | 3/2022 | Hsiao | G06N 3/045 |
| 2024/0070816 A1* | 2/2024 | Jandial | G06V 10/774 |
| 2024/0185588 A1* | 6/2024 | Kumari | G06V 10/778 |
| 2024/0249446 A1* | 7/2024 | Atzmon | G06T 11/00 |
| 2024/0338859 A1* | 10/2024 | Marri | G06V 10/74 |

OTHER PUBLICATIONS

R. T. Q. Chen, Y. Rubanova, J. Bettencourt, and D. K. Duvenaud. Neural ordinary differential equations. In Advances in Neural Information Processing Systems, vol. 31, 2018.

J. Ho, A. Jain, and P. Abbeel. Denoising diffusion probabilistic models. In Advances in Neural Information Processing Systems, vol. 33, 2020.

Y. Song, J. Sohl-Dickstein, D. P. Kingma, A. Kumar, S. Ermon, and B. Poole. Score-based generative modeling through stochastic differential equations. In International Conference on Learning Representations, 2021.

J. Ho and T. Salimans. Classifier-free diffusion guidance. In NeurIPS 2021 Workshop on Deep Generative Models and Downstream Applications, 2021.

(Continued)

*Primary Examiner* — Prabodh M Dharia
(74) *Attorney, Agent, or Firm* — Fish & Richardson P.C.

(57) ABSTRACT

Methods of customizing generation of objects using diffusion models are provided. One or more parameters (e.g., a conditioning signal, network weights, or an initial or starting noise) of the diffusion model can be optimized by a backpropagation process, which can be performed by solving an augmented adjoint ordinary differential equation (ODE) based on an adjoint sensitivity method. The customized diffusion model can generate stylized objects, generate objects with specific visual effect(s), and provide adversary examples to audit security of an object generation system.

18 Claims, 10 Drawing Sheets

(56) References Cited

OTHER PUBLICATIONS

R. Rombach, A. Blattmann, D. Lorenz, P. Esser, and B. Ommer. High-resolution image synthesis with latent diffusion models. In Proceedings of the IEEE/CVF Conference on Computer Vision and Pattern Recognition, pp. 10684-10695, 2022.
A. Radford, J. W. Kim, C. Hallacy, A. Ramesh, G. Goh, S. Agarwal, G. Sastry, A. Askell, P. Mishkin, J. Clark, G. Krueger, and I. Sutskever. Learning Transferable Visual Models From Natural Language Supervision. In Proceedings of the 38th International Conference on Machine Learning, pp. 8748-8763. PMLR, Jul. 2021. ISSN: 2640-3498.
L. Gatys, A. Ecker, and M. Bethge. A neural algorithm of artistic style. Nature Communications, 2015.

\* cited by examiner

CUSTOMIZING GENERATION OF OBJECTS USING DIFFUSION MODELS

FIELD

The embodiments described herein pertain generally to generating an object using a diffusion model. More specifically, the embodiments described herein pertain to customizing generation of objects using diffusion models.

BACKGROUND

A diffusion model is a machine learning model that may be used to receive a natural language description (e.g., text) as an input and generate an image that matches the description. For example, diffusion probabilistic models (DPMs) may include a family of generative models that diffuse data distributions into white Gaussian noise and then revert the stochastic diffusion process to synthesize new contents/images. DPM-based methods may generate various types of content such as, for example, images, videos, audio data, etc. In some cases, users may customize a commercially available diffusion model (e.g., a pre-trained DPM) to generate desired images. Such a customization of the diffusion model (e.g., the pre-trained DPM) may require multiple reference examples to align the pre-trained DPMs with user-provided concepts. For example, users may use multiple images of Vincent van Gogh paintings as an input to customize parameters of a pre-trained diffusion model such that the pre-trained diffusion model with the customized parameters can generate images having a style of Vincent van Gogh paintings. However, when the number of the input images of Vincent van Gogh paintings is limited, the resultant output image may not only appear to be painted in the style of Vincent van Gogh paintings, but also be constrained by the content of the input images, for example, a sunflower in the Vincent van Gogh paintings.

SUMMARY

In one example embodiment, a method is provided for generating a stylized object using a diffusion model. The method includes obtaining a reference style representation of a reference object, generating one or more objects by performing a forward generation process of the diffusion model, determining a style loss of each of the objects with respect to the reference object, optimizing network weights of the diffusion model by backpropagating a gradient of the style loss with respect to the network weights to minimize the style loss and to obtain a customized diffusion model with the optimized network weights, and generating the stylized object using the customized diffusion model with the optimized network weights, the stylized object having a style resembling the style of the reference object.

In another example embodiment, a method is provided for generating an object with a visual effect using a diffusion model. The method includes obtaining a reference object having a predetermined visual effect, and generating one or more objects by performing a forward generation process of a diffusion model with a control signal. The control signal is configured to control a visual effect of the objects. The method further includes determining a feature loss of each of the objects with respect to the reference object having the predetermined visual effect, optimizing the control signal by backpropagating a gradient of the feature loss with respect to the control signal to minimize the feature loss and to obtain a customized diffusion model with an optimized control signal, and generating the object using the customized diffusion model with the optimized control signal. The object has a visual effect resembling the predetermined visual effect of the reference object.

In yet another example embodiment, a method is provided for generating one or more objects by performing a forward generation process of a diffusion model with an input as a content conditioner and with a starting noise having a perturbation. The input corresponds to a reference class of content as identified by a classifier. The method further includes determining, via the classifier, a classification score for each of the objects, and determining a classification loss of the classification score with respect to a target class of content. The target class of content is different from the reference class of content. The method further includes optimizing the perturbation of the starting noise by backpropagating a gradient of the classification loss with respect to the perturbation to minimize the classification loss of the classification score and to obtain a customized diffusion model with an optimized starting noise, and generating the adversary example using the customized diffusion model with the optimized starting noise. The adversary example is identified by the classifier as the target class of content.

Embodiments described herein may provide examples of customizing generation of objects using diffusion models including, for example, generating stylized objects, generating objects with a specific visual effect, and providing adversary examples to audit security of an object generation system. Embodiments described herein may also provide examples of optimizing one or more parameters (e.g., a conditioning/control signal, network weights, or an initial or starting noise) of the diffusion model by a backpropagation process, which is performed by solving an augmented adjoint ordinary differential equation (ODE) based on an adjoint sensitivity method.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Non-limiting and non-exhaustive descriptions are described with reference to the following drawings. The components in the figures are not necessarily to scale, emphasis instead being placed upon illustrating principles. In the detailed description that follows, embodiments are described as illustrations only since various changes and modifications may become apparent to those skilled in the art from the following detailed description.

DETAILED DESCRIPTION

Figure 1:
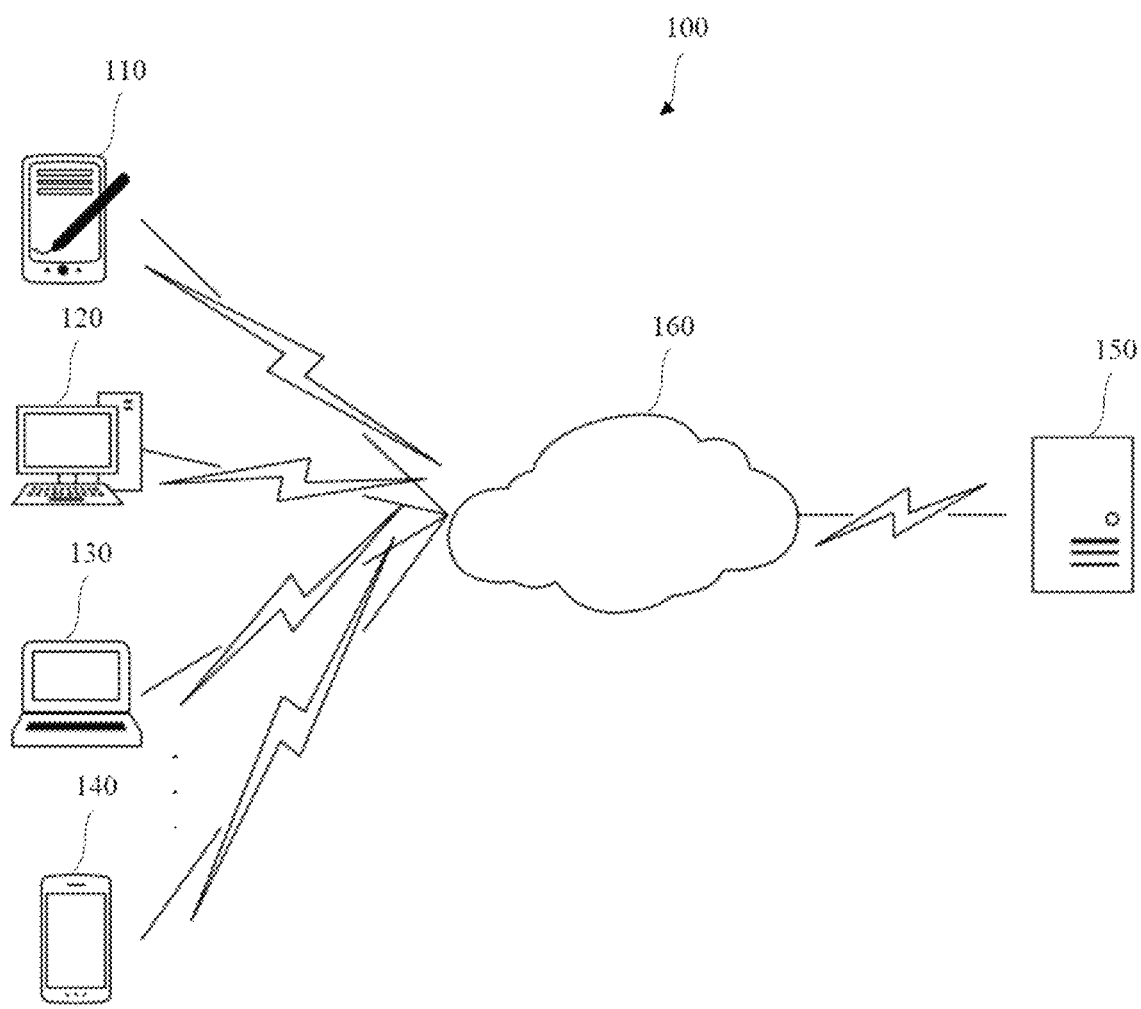
FIG. 1 is a schematic view of an example object generation system, arranged in accordance with at least some embodiments described herein.

In the following detailed description, particular embodiments of the present disclosure are described herein with reference to the accompanying drawings, which form a part of the description. In this description, as well as in the drawings, like-referenced numbers represent elements that may perform the same, similar, or equivalent functions, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not intended to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

It is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure.

Additionally, the present disclosure may be described herein in terms of functional block components and various processing steps. It should be appreciated that such functional blocks may be realized by any number of hardware and/or software components configured to perform the specified functions.

The scope of the disclosure should be determined by the appended claims and their legal equivalents, rather than by the examples given herein. For example, the steps recited in any method claims may be executed in any order and are not limited to the order presented in the claims. Moreover, no element is essential to the practice of the disclosure unless specifically described herein as "critical" or "essential".

As referenced herein, "text-to-image model" or "text-to-image generative model" may refer to a machine learning model that may be used to receive a natural language description (e.g., text) as an input and produce an image that matches the natural language description. It is to be understood that a text-to-image model typically includes a language model (which may be used to transform the received text input into a latent representation) and a generative image model (which may be used to produce an image conditioned on that latent representation). It is also to be understood that in the field of artificial intelligence and/or machine learning, training a text-to-image model typically requires a dataset of images that are paired with one or more text captions. It is further to be understood that "pre-trained" may indicate that a machine learning model has been trained and the corresponding training checkpoint has been used. A "pre-trained" text-to-image model may refer to a text-to-image model that has been trained on sufficient image and text data e.g., scraped from the web, a database, the cloud, etc.

As referenced herein, "diffusion model," "diffusion generative model," or "diffusion-based model" in machine learning may refer to a diffusion probabilistic model and/or a latent variable model. It is to be understood that diffusion models are designed to learn the latent structure of a dataset by modeling the way in which data points diffuse through the latent space. For example, in computer vision, diffusion models include a neural network that is trained to de-noise images blurred with Gaussian noise to reverse the diffusion process. It is also to be understood that diffusion models may be applied to a variety of tasks, including image de-noising, in-painting, super-resolution, image generation, etc. For example, utilization of an image generation diffusion model may start with a random noise image and then, after having been trained to reverse the diffusion process performed on natural images, the diffusion model may be implemented to generate new natural images. It is further to be understood that given an image ("$x_0$") randomly sampled from a real data distribution, there can be two processes in a diffusion model: (1) a diffusion process that repeatedly adds Gaussian noise to the sample to generate a diffused sample so that the sample gradually becomes Gaussian noise after a certain amount (e.g., the number T) of operations or iterations ($x_0 \rightarrow x_T$), and (2) a reverse process (or referred to as a de-noising process, etc.) that repeatedly de-noises given a Gaussian noise input (e.g., the diffused sample, etc.) to generate a de-noised output ($x_T \rightarrow x_0$).

It is to be understood that a diffusion process may be a continuous-time Markov process with continuous sample paths. The diffusion process may corrupt a sample (e.g., an image, etc.) by adding Gaussian noise to the sample. As referenced herein, "Gaussian noise" may denote a type of signal noise that has a probability density function equal to that of the normal distribution (also known as the Gaussian distribution). It is also to be understood that a de-noising process (or noise reduction process) may be a process of removing noise from a sample. It is further to be understood that in some example embodiments, the de-noising process may distort the sample to a certain degree.

It is to be understood that "pre-trained diffusion probabilistic model (DPM)" may refer to a pre-trained (described above), diffusion-based (having a diffusing process and a de-noising process from a diffusion model, described above), text-to-image generative model (described above). In an example embodiment, a text-to-image diffusion-based generative model may refer to a diffusion-based generative model that accepts a text input and synthesizes an image matching the text input. It will be appreciated that a machine learning model, such as a text-to-image diffusion-based generative model, may transform an input text into a latent representation to produce an image conditioned on that latent representation.

As referenced herein, "conditioning input." or "conditioning" or "conditioner" may refer to the input on which an operation of a process of the machine learning model is conditioned (e.g., to generate an output consistent with the conditioner). In the embodiments described and recited herein, "conditioning input," "conditioning," and "conditioner" may be used interchangeably without deviating from the intended meaning and/or scope.

As referenced herein, "conditioning signal," "control signal" may refer to a signal of a machine learning model to control the process of encoding or embedding a given input into a meaningful representation that can guide the generation process of the machine learning model. One example control signal is a prompt embedding (e.g., a text embedding) which can capture the semantic aspects of the input, help shape the characteristics of the generated images, and control a visual effect of the images.

It is to be understood that a text prompt may be a conditioner for a text-to-image model to generate an image that is semantically consistent with the text prompt e.g., by optimizing the latent vector or the generator to maximize the similarity between the text prompt and the image. That is, the text-to-image model may generate an image conditioned on or consistent with the conditioner (e.g., a text prompt).

It is to be understood that an object (e.g., an image, etc.) may include metadata (such as keywords, tags, or descriptions associated with the object) and non-metadata such as features of the object (e.g., color, shape, texture, element or component or part, position of the element, or any other information that may be derived from the object itself) rather than the metadata. As referenced herein, the "content" of an object may refer to non-metadata information (e.g., the element, the component, the part, and/or the category of the object, etc.) of the object.

As referenced herein, "style" may refer to the visual appearance or unique visual characteristics that can distinguish one image from another. A style of image may encompass various elements such as, e.g., color, texture, pattern, or an overall visual composition. A Gram matrix is a commonly used style representation for capturing the style of an image. A Gram matrix may be derived from a feature map of a convolutional neural network (CNN). It is to be understood that the style of an object (e.g., an image) is a subjective concept and may be represented by various style representations other than a Gram matrix.

As referenced herein, "content conditioner" may refer to a content input (e.g., content of an object corresponding to a text input, etc.) on which an operation of a process of a machine learning model is conditioned (e.g., to generate a content of an output consistent with the content conditioner). For example, in a pre-trained DPM (e.g., a text-to-image diffusion-based generative model), a content conditioner may be injected or applied or added e.g., by performing a de-noising process to generate the content of an image conditioned on or consistent with the content conditioner. It is to be understood that a text prompt may be a content conditioner for a text-to-image diffusion-based generative model to generate a content of an image consistent with the text prompt e.g., by optimizing the latent vector or the generator to maximize the similarity between the text prompt and the content of the image. That is, the text-to-image diffusion-based generative model may generate a content of an image conditioned on or consistent with the content conditioner (e.g., a text prompt).

As referenced herein, "similarity" may refer to a numeric value representing a degree of how close two objects (e.g., two images, two concepts corresponding to respective objects, etc.) are when the two objects are compared. It is to be understood that a similarity between two objects may be determined by using e.g., technologies such as sum of squared differences, mutual information, normalized mutual information, cross-correlation, etc. In an example embodiment, the higher the similarity (or value), the more contextually similar the two objects are. In such embodiment, a similarity (or value) "0" may indicate that the two objects are completely different. It is to be understood that in another example embodiment, the lower the similarity (or value), the more contextually similar the two objects are. In such embodiment, a similarity (or value) "0" may indicate that the two objects are identical.

As reference herein, "backpropagation." "backpropagate," or "backpropagating" may refer to an algorithm for training feedforward neural networks in a machine learning model. In fitting a neural network, backpropagation may compute the gradient of a loss function with respect to parameters (e.g., network weights) of the neural network for an input-output example. "Loss" or "loss function" may refer to a measure of the difference or distance between a predicted output of a model and a target or reference value. A loss may quantify how well the model can perform on a given task and serve as a guide for adjusting the model's parameters during a training/optimizing/customizing process of the model. Various loss functions may include, for example, mean squared error (MSE) loss, binary cross-entropy loss, categorical cross-entropy loss, reconstruction loss, etc. The choice of loss function may depend on the specific task in desired scenarios or applications.

FIG. 1 is a schematic diagram of an example object generation system, arranged in accordance with at least some embodiments described herein. In an example embodiment, the system 100 may be an object generation system using a diffusion model which may include a customized diffusion generative model.

The system 100 may include terminal devices 110, 120, 130, and 140, a network 160, and a server 150 (e.g., a server for providing a customized diffusion generative model). It is to be understood that FIG. 1 only shows illustrative numbers of the terminal devices, the network, and the server. The embodiments described herein are not limited to the number of the terminal devices, the network, and/or the server described. That is, the number of terminal devices, networks, and/or servers described herein are provided for descriptive purposes only and are not intended to be limiting.

In accordance with at least some example embodiments, the terminal devices 110, 120, 130, and 140 may be various electronic devices. The various electronic devices may include but not be limited to a mobile device such as a smartphone, a tablet computer, an e-book reader, a laptop computer, a desktop computer, and/or any other suitable electronic devices.

In accordance with at least some example embodiments, the network 160 may be a medium used to provide a communications link between the terminal devices 110, 120, 130, 140 and the server 150. The network 160 may be the Internet, a local area network (LAN), a wide area network (WAN), a local interconnect network (LIN), a cloud, etc. The network 160 may be implemented by various types of connections, such as a wired communications link, a wireless communications link, an optical fiber cable, etc.

In accordance with at least some example embodiments, the server 150 may be a server for providing various services, such as providing customized diffusion generative models, etc., to users using one or more of the terminal devices 110, 120, 130, and 140. The server 150 may be implemented by a distributed server cluster including multiple servers or may be implemented by a single server.

A user may use one or more of the terminal devices 110, 120, 130, and 140 to interact with the server 150 via the network 160. Various applications or localized interfaces thereof, such as data query services, or the like, may be installed on the terminal devices 110, 120, 130, and 140.

It is to be understood that software applications or services according to the embodiments described herein and/or according to the services provided by the object generation system may be performed by the server 150 and/or the terminal devices 110, 120, 130, and 140 (which may be referred to herein as user devices). Accordingly, the apparatus for the software applications and/or services may be arranged in the server 150 and/or in the terminal devices 110, 120, 130, and 140.

It is also to be understood that when a service is not performed remotely, the system 100 may not include the network 160, but include only the terminal device 110, 120, 130, and 140 and/or the server 150.

It is further to be understood that the terminal device 110, 120, 130, and 140 and/or the server 150 may each include one or more processors, a memory, and a storage device storing one or more programs. The terminal device 110, 120, 130, and 140 and/or the server 150 may also each include an Ethernet connector, a wireless fidelity receptor, etc. The one or more programs, when being executed by the one or more processors, may cause the one or more processors to perform the method(s) described in any embodiments described herein. Also, it is to be understood that a computer readable non-volatile medium may be provided according to the embodiments described herein. The computer readable medium stores computer programs. The computer programs are used to, when being executed by a processor, perform the method(s) described in any embodiments described herein.

Figure 2:
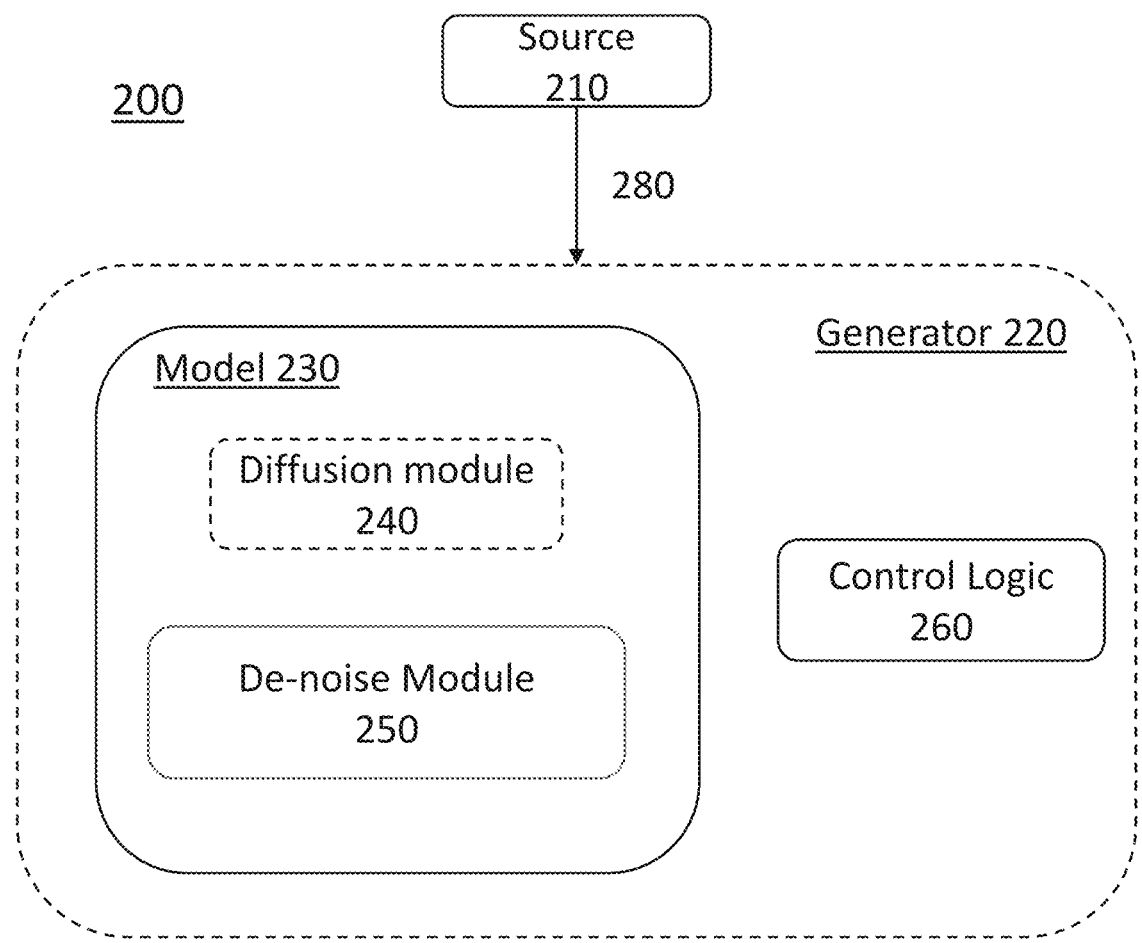
FIG. 2 illustrates an example system in which generating an object using a diffusion model may be implemented, arranged in accordance with at least some embodiments described herein.

FIG. 2 illustrates an example system 200 in which customizing a diffusion model and/or generating an object using the customized diffusion model may be implemented, arranged in accordance with at least some embodiments described herein.

The system 200 may include a source 210 and a generator 220. In an example embodiment, the source 210 may be an electronic device (e.g., 700 of FIG. 7, etc.) including but not limited to a camera, an audio and/or video recorder, a smartphone, a tablet computer, a laptop computer, a desk computer, and/or any other suitable electronic device. In another example embodiment, the source 210 may be a storage, a database, a file, or the like. The source 210 may provide input 280 to the generator 220. In an example embodiment, the generator 220 may be an electronic device (e.g., 700 of FIG. 7, etc.) including but not limited to a camera, an audio and/or video recorder, a smartphone, a tablet computer, a laptop computer, a desk computer, and/or any other suitable electronic device. In another example embodiment, the generator 220 may be a function, an operation, an action, an algorithm, an application, or the like. In an example embodiment, the input 280 may include a text, an image, an audio, a video, etc. that is captured, generated, obtained, user-entered, etc. via the source 210. In another example embodiment, the input 280 may include a text, an image, an audio, a video, etc. that is stored in the source 210.

Figure 3:
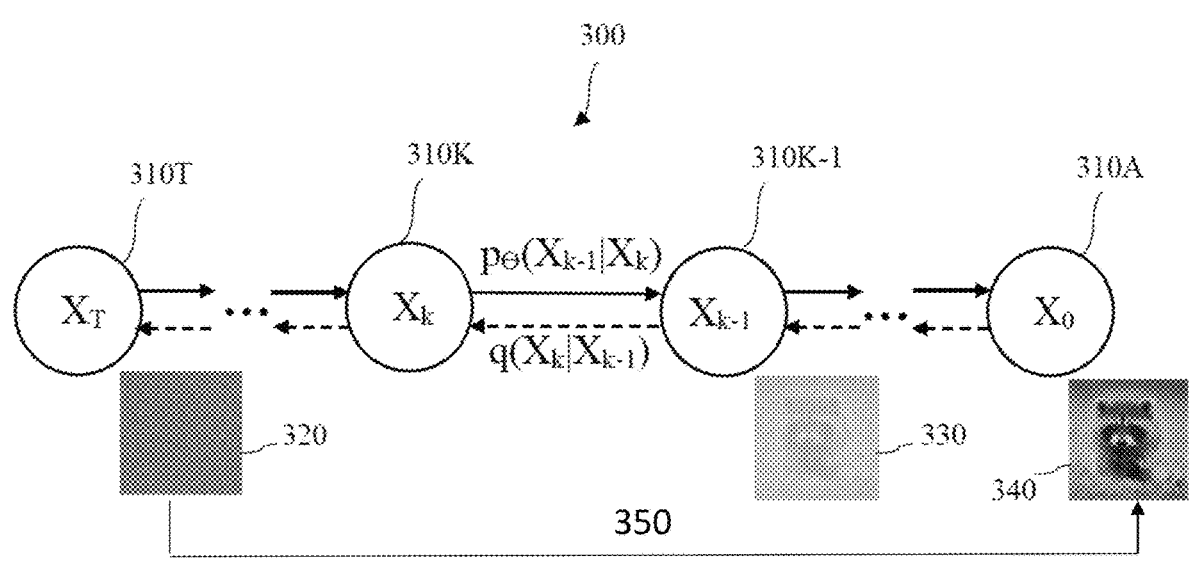
FIG. 3 illustrates an example process of generating an object using the system of FIG. 2, arranged in accordance with at least some embodiments described herein.

The generator 220 may receive input 280 from the source 210, and generate an object based on the received input 280 (see e.g., description of FIG. 3). In an example embodiment, the generator 220 includes a model 230, and a control logic 260. The generator 220 may be hosted, implemented, executed, and/or stored in a device (e.g., 700 of FIG. 7, etc.). It is to be understood that although the system 200 is illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or any combination thereof.

In an example embodiment, the control logic 260 may include multiple operations or functions (see e.g., descriptions of FIGS. 4A, 5A and 6A) to customize the model 230 and to generate an object based on the received input 280 using the customized model 230. The model 230 may be a machine learning model, such as a pre-trained DPM (e.g., a text-to-image diffusion-based generative model). The model 230 includes a de-noising module 250 and an optional diffusing module 240.

In an example embodiment, the diffusing module 240 may include multiple diffusion operations or functions (see e.g., description of FIG. 3) that, when implemented or executed, repeatedly add noise (e.g., Gaussian noise, etc.) to an input object (e.g., the input 280, etc.) to generate a diffused object so that the object gradually becomes a Gaussian noise after a certain number of operations or iterations. The de-noising module 250 may include multiple de-noising operations or functions (see e.g., descriptions of FIGS. 3, 4A, 5A and 6A) to repeatedly de-noise given a Gaussian noise input (e.g., the diffused object) to generate a de-noised output.

FIG. 3 illustrates an example process 300 of generating an object using the model 230 of the system 200 of FIG. 2, arranged in accordance with at least some embodiments described herein. As discussed in FIG. 2, the model 230 may be a pre-trained DPM (e.g., a text-to-image diffusion-based generative model) including a de-noising module 250 and an optional diffusing module 240.

In an example embodiment, the diffusing module 240 may execute a diffusion process (also referred to as a diffusing process). See the dotted-line arrows in FIG. 3. The diffusion process starts with a process node "$x_0$". The process nodes are labeled as 310A-310T. In an example embodiment, the process node 310A $x_0$ receives the image 340 as an input. The image 340 may be an image obtained or randomly sampled from a real data distribution, or an image input received from the source 210 of FIG. 2, etc. In an example embodiment, the diffusion process may include a certain (e.g., the number T) number of operations or iterations from the process node $x_0$ to the process node 310T $x_T$ ($x_0 \rightarrow x_T$). In some example embodiments, the number T may be one, at least two, 50, 1000, or any other number. From $x_0$, the diffusion process may add noise such as Gaussian noise to the image 340 (e.g., to corrupt the image 340) to generate a diffused or corrupted image (e.g., at $x_1$). The diffusion process may repeatedly add noise to the diffused image generated at a previous process node and at $x_{k-1}$, the diffused image becomes image 330, which is a partially diffused or corrupted image. The diffusion process may continue to repeatedly add noise to the diffused image generated at a previous process node and at $x_T$, the diffused image becomes 320 (a Gaussian noise image). That is, the diffusion process may repeatedly add noise to the image 340 to generate a diffused image whereby the image gradually becomes a Gaussian noise after T operations or iterations ($x_0 \to x_T$). As shown in FIG. 3, the diffusion process from the process node $x_{k-1}$ to the process node xx is represented as q ($x_k|x_{k-1}$).

In an example embodiment, the de-noising module 250 may execute a de-noising process. See the solid-line arrows in FIG. 3, illustrating an exemplary stochastic de-noising process. The de-noising process starts with a process node 310T "$x_T$". In an example embodiment, the process node 310T $x_T$ receives the image 320 as an input. In an example embodiment, the de-noising process may include "T" number of operations or iterations from the process node 310T $x_T$ to the process node 310A $x_0$ ($x_T \to x_0$). The image 320 may be a random noise image (e.g., a Gaussian noise image). From 310T $x_T$, the de-noising process may de-noise (e.g., remove or filter noise such as Gaussian noise from) the image to generate a de-noised natural image (e.g., at $x_0$). The de-noising process may de-noise the image from a previous process node and at $x_{k-1}$, the de-noised image becomes image 330, which may be a partially de-noised image. The de-noising process may continue to repeatedly de-noise the image from a previous process node and at $x_0$, the de-noised image becomes 340 (a de-noised natural image substantially without Gaussian noise, or a clean image). As referenced herein, a clean object (e.g., a clean image) may refer to a de-noised object that is substantially without noise. That is, the de-noising process may repeatedly de-noise the random noise image 320 to generate a final or clean image 340 after T operations or iterations ($x_T \to x_0$). As shown in FIG. 3, the de-noising process (e.g., the prediction of $x_{k-1}$ based on xx) from the process node xx to the process node $x_{k-1}$ is represented as $p_\theta(x_{k-1}|x_k)$.

In one example embodiment, the diffusion module 240 can execute a diffusion process represented by Equation (1) below:

$$dx_t = f(t)x_t dt + g(t)dw_t, x_0 \sim q_0(x), t \in [0, T] \quad (1)$$

where $q_0$ denotes an unknown d-dimensional data distribution, $x_t$ is the state of data distribution at time t, $w_t$ is the standard Wiener process (Brownian motion), $f(t) x_t$ is a vector-valued function called drift coefficient of $x_t$, and g(t) is a scalar function known as diffusion coefficient. The marginal distribution of $x_T$ can be approximately represented by a normal distribution $\mathcal{N}$ (0, $\sigma_T^2 I$). In this manner, the diffusion process can be represented as $\{x(t)\}_{t \in [0,T]}$.

The de-noising module 250 can execute a de-noising process by solving a deterministic probability-flow ordinary differential equation (ODE) instead of by a stochastic de-noising process (e.g., as represented by $p_\theta(x_{k-1}|x_k)$ in FIG. 3). "Probability-flow ODE" is a term of art that can define a mathematical frame work in probabilistic modeling to describe the flow of probability densities. In one example embodiment, when the diffusion process is formulated by Equation (1) above, the deterministic probability-flow ODE can be represented as Equation (2) below:

$$dx = \left[f(t)x_t + \frac{g(t)^2}{2\sigma_t}\epsilon_\theta(x_t, t)\right]dt \quad (2)$$

where $x_t$ denotes the state or object at the point of time t, $f(t) x_t$ denotes a vector-valued function called drift coefficient of $x_t$, g(t) denotes a scalar function called diffusion coefficient, and $\epsilon_\theta$ denotes a de-noising model/function for predicting a noise to be removed for the input $x_t$ at the point of time t.

In one example embodiment, the model 230 may execute a de-noising process to generate a clean object by solving the above Equation (2). Such a de-noising process may be referred as a forward generation process 350. The de-noising process may start with the starting process node $x_T$ with a starting noise as an input (e.g., the starting noise image 320) at the point of time t=T, and repeatedly de-noise the image from a previous process node $x_t$ at the point of time t. For example, an intermediate object (e.g., the partially de-noised image 330) can be obtained at the point of time t. At the final process node $x_0$, the de-noised image becomes a clean object (e.g., the de-noised natural image 340 substantially without Gaussian noise) at the point of time t=0. That is, the generating of a clean object may include the generating of a final image after a completion of iteratively de-noising a starting noise by performing the forward generation process of the diffusion model 230. For example, as shown in the embodiment of FIG. 3, the forward generation process 350 with a starting noise 320 can generate a final image (i.e., a clean object) 340 by solving the deterministic probability-flow ODE which can be represented as Equation (2) above according to an embodiment.

In one example embodiment, the control logic 260 can control the model 230 to perform a forward generation process by repeatedly de-noising an initial or starting noise. The forward generation process may be formatted as solving an ODE initial value problem including steps of re-parameterizing the initial or starting noise, re-parameterizing time-steps, and solving the forward generation ODE to generate clean objects. As referenced herein, "re-parameterizing," "reparameterizing," "re-parameterize," or "reparameterize" is a term of art which may refer to a technique used to transform an ODE into a new form that may facilitate numerical calculations (e.g., integration, gradient computation, etc.).

With the generated clean objects, the control logic 260 can customize the diffusion model 230 by optimizing one or more parameters of the diffusion model 230. Such an optimization can be obtained by minimizing a loss function L based on the generated clean objects. The one or more parameters of the diffusion model 230 may include, for example, network weights θ, a conditioning/control signal c, and an initial noise $x_T$ at the time point of T. In one example embodiment, the minimization can be represented as $\min_{\psi \in \{x_T, c \cdot \theta\}} L(\Phi(x_T, c, \epsilon_\theta))$, where ψ denotes the one or more parameters of the diffusion model, L denotes the loss function based on the generated objects as denoted as $\Phi(x_T, c, \epsilon_\theta)$, and $\epsilon_\theta$ denotes a de-noising model.

To solve the optimization problem, the control logic 260 can implement a backpropagation (BP) process to compute the gradient of the loss function $L(x_0)$ based on the generated clean objects (e.g., the de-noised natural image 340 without Gaussian noise at the point of time t=0) with respect to the one or more parameters of the diffusion model.

In one example embodiment, the control logic 260 can perform the backpropagating of the gradient of the loss function by solving an augmented adjoint ordinary differential equation (ODE) based on an adjoint sensitivity method. "Augmented adjoint ODE" is a term of art that can be an extension of a probability-flow ODE framework by incorporating an augmented state, and introducing additional variables (e.g., adjoints). "Adjoint sensitivity method" is a term of art that is a technique used to efficiently compute a gradient of an ODE solution. One example augmented adjoint ODE can be represented as Equation (3) below:

$$d\begin{bmatrix} x_t \\ \frac{\partial L}{\partial x_t} \\ \frac{\partial L}{\partial \theta} \\ \frac{\partial L}{\partial t} \end{bmatrix} = -\begin{bmatrix} -f(t)x_t - \frac{g(t)^2}{2\sigma_t}\tilde{\epsilon}_\theta(x_t, t, c) \\ f(t)\frac{\partial L}{\partial x_t} + \frac{\partial L}{\partial x_t}\frac{g(t)^2}{2\sigma_t}\frac{\partial \tilde{\epsilon}_\theta(x_t, t, c)}{\partial x_t} \\ \frac{\partial L}{\partial x_t}\frac{g(t)^2}{2\sigma_t}\frac{\partial \tilde{\epsilon}_\theta(x_t, t, c)}{\partial \theta} \\ \frac{df(t)}{dt}\frac{\partial L}{\partial x_t}x_t + \frac{\partial L}{\partial x_t}\frac{\partial [g(t)^2/2\sigma_t\tilde{\epsilon}_\theta(x_t, t, c)]}{\partial t} \end{bmatrix}dt \quad (3)$$

where $x_t$ denotes the state or object at the point of time t, $f(t)x_t$ denotes a vector-valued function called drift coefficient of $x_t$, g(t) denotes a scalar function called diffusion coefficient, L denotes the loss function based on the generated objects as denoted as $\Phi(x_T, c, \epsilon_\theta)$, $\theta$ denotes network weights, $\sigma_t$ denotes a standard variation of a normal distribution, and $\epsilon_\theta$ denotes a denoising model for predicting a noise to be removed for the input $x_t$ at the point of time t.

In one example embodiment, the control logic 260 can reparameterize the augmented adjoint ODE to reduce the numerical error of solving the augmented adjoint ODE. For example, the augmented ODE can be reparametrized as a simple non-stiff ODE using exponential integration. As an example, the above Equation (3) can be reparametrized by denoting $y_t=$ $$e^{-\int_0^t f(\tau)d\tau}x_t, \frac{d\rho}{dt} = e^{-\int_0^t f(\tau)d\tau}\frac{g(t)^2}{2\sigma_t} \text{ and } \rho = \gamma(t),$$

where $\gamma(t)$ may monotonically increase when t increases from 0 to T. The original augmented adjoint ODE (e.g., Equation 3) can be reparameterized as Equation (4) below:

$$d\begin{bmatrix} y \\ \frac{\partial L}{\partial y} \\ \frac{\partial L}{\partial \theta} \\ \frac{\partial L}{\partial \rho} \end{bmatrix} = -\begin{bmatrix} -\tilde{\epsilon}_\theta\left(e^{\int_0^{\gamma^{-1}(\rho)} f(\tau)d\tau}y, \gamma^{-1}(\rho), c\right) \\ \frac{\partial L}{\partial y}\frac{\partial \tilde{\epsilon}_\theta\left(e^{\int_0^{\gamma^{-1}(\rho)} f(\tau)d\tau}y, \gamma^{-1}(\rho), c\right)}{\partial y} \\ \frac{\partial L}{\partial y}\frac{\partial \tilde{\epsilon}_\theta\left(e^{\int_0^{\gamma^{-1}(\rho)} f(\tau)d\tau}y, \gamma^{-1}(\rho), c\right)}{\partial \theta} \\ \frac{\partial L}{\partial y}\frac{\partial \tilde{\epsilon}_\theta\left(e^{\int_0^{\gamma^{-1}(\rho)} f(\tau)d\tau}y, \gamma^{-1}(\rho), c\right)}{\partial \rho} \end{bmatrix}d\rho \quad (4)$$

The control logic 260 can obtain the gradient of a loss function by solving a reverse-mode or reverse-time, reparameterized augmented adjoint ODE (e.g., Equation (4)). Here, "reverse mode or reverse-time" is used with respect to "a forward generation process" regarding opposite time series (e.g., from the point of time t=0 to t=T, or from the point of time t=T to t=0, respectively). The control logic 260 can optimize one or more parameters of the diffusion model 230 by backpropagating the obtained gradient of the loss function with respect to the one or more parameters to minimize the loss function and to obtain a customized diffusion model with the optimized parameters (e.g., a conditioning/control signal, network weights, or an initial or starting noise).

In one example embodiment, the control logic 260 can control the model 230 to perform a backpropagation process to backpropagate the gradients of the loss to optimize one or more parameters of the model 230, with a de-noising model, a final state, and a loss gradient of the final state as the input. The backpropagation process may be formatted as solving a reverse-mode derivative of an ODE initial value problem, including steps of defining an initial augmented state, defining dynamics on an augmented state, concatenating time-derivatives, solving a reverse-time ODE, and returning gradients of the loss to optimize one or more parameters of the model.

Features in the embodiments described herein may provide methods of customizing a diffusion model to obtain a customized model based on a computable and differentiable metric. Example metric may include a style representation, a visual effect, or a class of content according to a classifier. The metric can be evaluated on one or more clean objects which can be generated using the diffusion model by performing a forward generation process. That is, a loss of each of the clean objects can be determined with respect to the metric, for example, of a reference object. The loss may include, for example, a style loss, a feature loss, or a classification loss. One or more parameters of the diffusion model can be optimized by backpropagating a gradient of the loss with respect to the one or more parameters to minimize the loss and to obtain the customized model with the optimized one or more parameters. The one or more parameters may include network weights, a conditioning/control signal, or an initial or starting noise, which can be optimized by minimizing the corresponding loss, e.g., the style loss, the feature loss, or the classification loss.

In one example embodiment, the forward generation process can be performed by solving a probability-flow ODE (e.g., Equation (2) above), and the backpropagating of the gradient of the loss can be performed by solving an augmented adjoint ODE (e.g., Equation (3) above) based on an adjoint sensitivity method. To reduce numerical errors in both the forward generation process and the gradient backpropagation process, the probability-flow ODE and augmented ODE can each be reparameterized as a simple non-stiff ODEs (e.g., see the reparameterized Equation (4) above) using exponential integration.

Figure 4A:
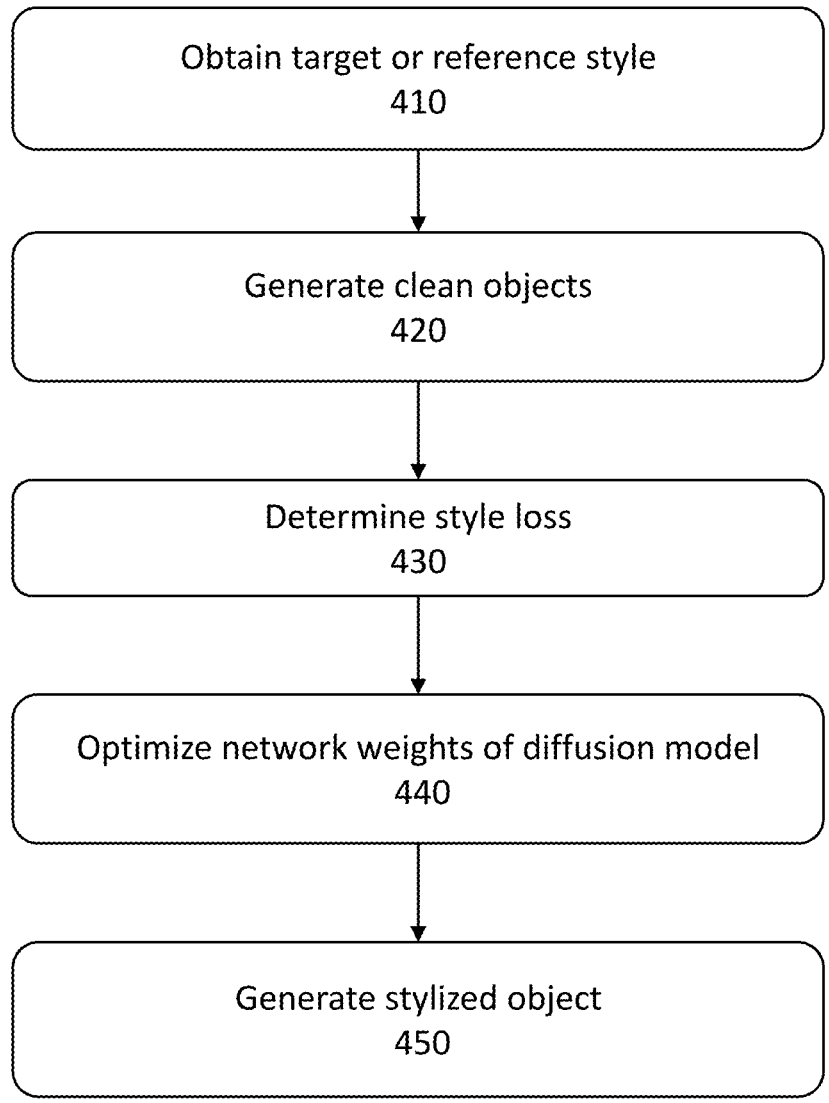
FIG. 4A is a flow chart illustrating an example processing flow of customizing a diffusion model to generate objects having a style, in accordance with at least some embodiments described herein.

FIG. 4A is a flow chart illustrating an example processing flow 400 of customizing a diffusion model to generate objects having a style, in accordance with at least some embodiments described herein. It is to be understood that the processing flow 400 disclosed herein may be conducted by one or more processors (e.g., the central processor unit 705 of FIG. 7, or any other suitable processor), one or more components of FIG. 1, or one or more modules of FIG. 2, unless otherwise specified. The conducting processor may communicate with other components of the system 200 of FIG. 2.

It is also to be understood that the processing flow 400 may include one or more operations, actions, or functions as illustrated by one or more of blocks 410, 420, 430, 440, and 450. These various operations, functions, or actions may, for example, correspond to software, program code, or program instructions executable by a processor that causes the functions to be performed. Although illustrated as discrete blocks, obvious modifications may be made, e.g., two or more of the blocks may be re-ordered; further blocks may be added; and various blocks may be divided into additional blocks, combined into fewer blocks, or eliminated, depending on the desired implementation. Processing flow 400 may begin at block 410.

Figure 4B:
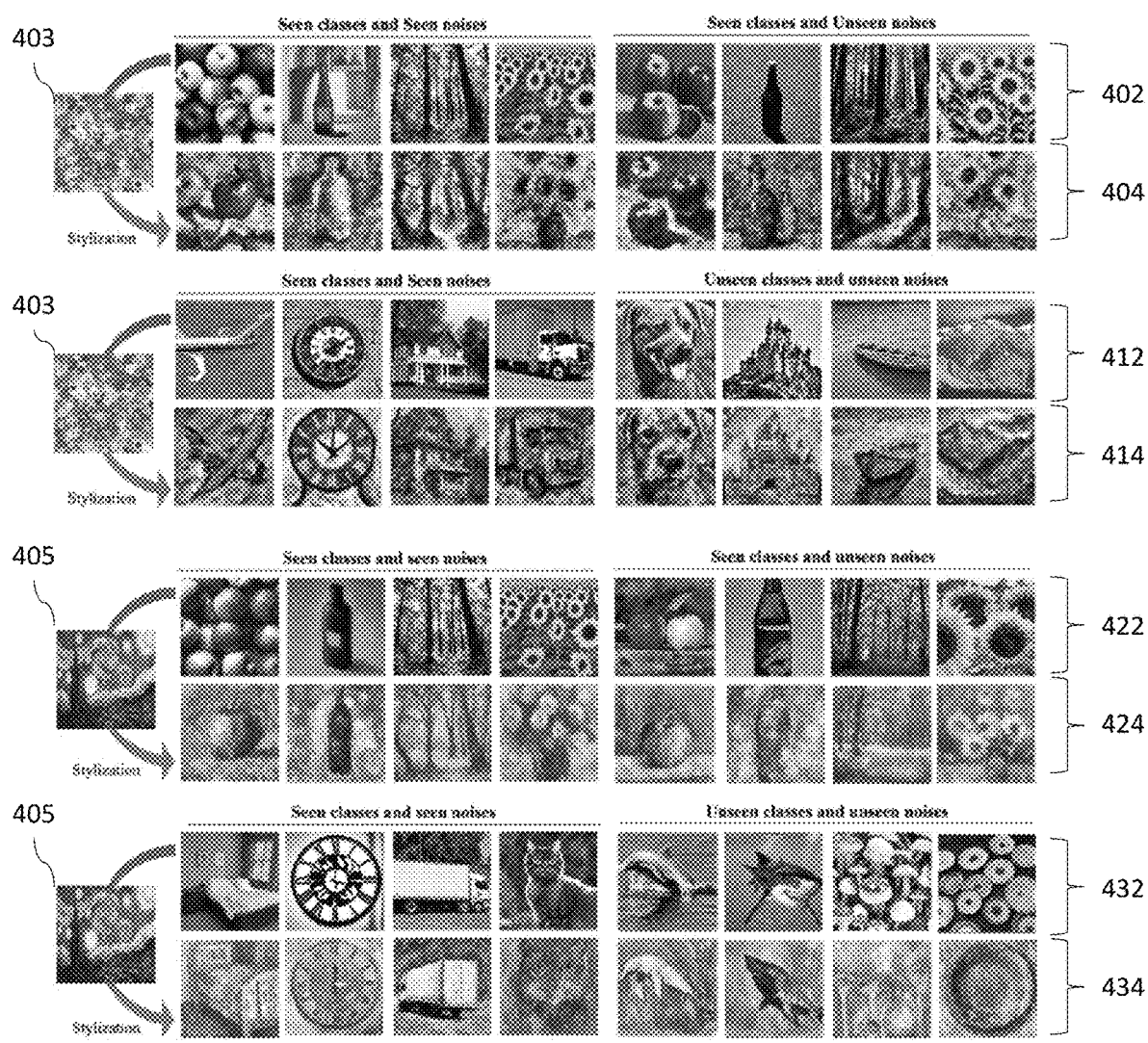
FIG. 4B illustrates an example process of generating objects having a style using the customized diffusion model of FIG. 4A, arranged in accordance with at least some embodiments described herein.

At block 410 (Obtain target or reference style), the processor may obtain or receive a target or reference style representation representing a style of a target or reference object from e.g., the source 210 of FIG. 2. It is to be understood that the process at block 410 may be implemented e.g., in the control logic 260 of the generator 220 of FIG. 2. An example style representation may be a Gram matrix, which can be obtained by, for example, using a pre-trained convolutional neural network (CNN) to extract features from an image. The target or reference style can be defined by a reference Gram matrix, which may represent a style of the target or reference object. For example, a target or reference style representation (e.g., a Gram matrix) can be obtained from a target or reference image (e.g., image 405 in FIG. 4B showing "The starry night" of Vincent van Gogh). It is to be understood that a style of an image can be represented by any suitable representations other than a Gram matrix. Processing may proceed from block 410 to block 420.

At block 420 (Generate clean objects), the processor may generate one or more clean objects by performing a forward generation process of a diffusion model. In one example embodiment, the generating of the clean objects may include generating a final image after a completion of iteratively de-noising a starting noise by performing the forward generation process of the diffusion model. For example, the de-noising module 250 of the model 230 can perform the forward generation process 350 with the starting noise 320 to generate the final image 340, as shown in FIGS. 2 and 3. In one example embodiment, the diffusion model can be a pre-trained DPM (e.g., a text-to-image diffusion-based generative model) with an input as a content conditioner to generate the clean objects. The clean objects can be generated using the forward generation process 350 with multiple pairs of starting noise 320 and a text prompt. For example, a user may input a text prompt (e.g., "apple") as a content conditioner to the pre-trained text-to-image diffusion-based generative model to generate a content of an image consistent with the text prompt. Processing may proceed from block 420 to block 430.

At block 430 (Determine style loss), the processor may determine a style loss of each of the clean objects with respect to the reference object. In one example embodiment, a style loss of the Gram matrix of each of the clean objects can be determined with respect to the reference Gram matrix of the reference object. In one example embodiment, the style loss and a content loss of each of the clean objects may be combined and determined with respect to the reference object. The content loss may refer to a measure of the difference or distance between features of a clean object and that of the target or reference object. The features of an image may be extracted using a pre-trained convolutional neural network (CNN). A loss function of mean squared errors (MSE) can be used to determine the style loss and the content loss. It is to be understood that other suitable loss functions can be used. Processing may proceed from block 430 to block 440.

At block 440 (Optimize network weights of diffusion model), the processor may optimize network weights of the diffusion model by backpropagating a gradient of the style loss with respect to the network weights to minimize the style loss and to obtain a customized diffusion model with the optimized network weights. In one example embodiment, the combination of the style loss and the content loss can be minimized to optimize the network weights of the diffusion model. In one example embodiment, the backpropagating of the gradient of the style loss can be performed by solving an augmented adjoint ordinary differential equation (ODE) based on an adjoint sensitivity method (e.g., see the augmented adjoint ODE, Equation (3) as described above). The augmented adjoint ODE can be reparameterized to reduce the numerical error of solving the augmented adjoint ODE (e.g., see the reparameterized augmented adjoint ODE, Equation (4) as described above). Processing may proceed from block 440 to block 450.

At block 450 (Generate stylized object), the processor may generate a stylized object using the customized diffusion model with the optimized network weights. The stylized object may have a style resembling the style of the reference object. That is, the stylized object may have substantially the same visual appearance or unique visual characteristics of the reference object. For example, when a user inputs a text prompt (e.g., "apple") as a content conditioner to the customized diffusion model that is customized to generate objects having a target or reference style representation (e.g., a Gram matrix), the customized diffusion model can generate a content of an image consistent with the text prompt (e.g., "apple") and having substantially the same visual appearance or unique visual characteristics of the reference object (e.g., a Vincent van Gogh painting).

FIG. 4B illustrates an example process of generating various stylized objects using the customized diffusion model obtained by the processing flow 400 of FIG. 4A, arranged in accordance with at least some embodiments described herein. The customized diffusion model with the optimized network weights can generate objects having a style resembling a target or reference style (e.g., from a target or reference image).

In the embodiment depicted in FIG. 4B, the images 402, 412, 422, and 432 are generated using a diffusion model before optimizing the network weights thereof, which may be a pre-trained DPM (e.g., a text-to-image diffusion-based generative model) with an input as a content conditioner. For example, a user may input a text prompt (e.g., "apple") as a content conditioner to the pre-trained text-to-image diffusion-based generative model to generate a content of an image consistent with the text prompt. The generated images 402, 412, 422, and 432 may not have the target or reference style of the reference images 403 and 405. That is, the images 402, 412, 422, and 432 generated before optimizing the network weights of the diffusion model may not have the visual appearance or unique visual characteristics of the target or reference object.

The diffusion model can be customized using the processing flow 400 of FIG. 4A such that the customized model can generate stylized objects having a style resembling (e.g., substantially the same as) the style of the reference object. For example, when the user inputs the same text prompts (e.g., "apple") as a content conditioner to the customized diffusion model with the optimized network weights, images 404, 414, 424, and 434 are generated, which correspond to the images 402, 412, 422, and 432 generated before optimizing the network weights. The generated images 404, 414, 424, and 434 have the respective target or reference styles of the reference images 403 and 405. That is, the images 404 and 414 each have the visual appearance or unique visual characteristics of the target or reference image 403, and the images 424 and 434 each have the visual appearance or unique visual characteristics of the target or reference image 405. It is to be understood that the customized diffusion model can generate stylized objects regardless whether or not a content of the objects (e.g., "apple") has been used for training or customizing the diffusion model (i.e., "seen classes" or "unseen classes"). It is also to be understood that customized diffusion model can generate stylized objects regardless whether or not a starting noise has been used for training or customizing the diffusion model (i.e., "seen noises" or "unseen noises").

Figure 5A:
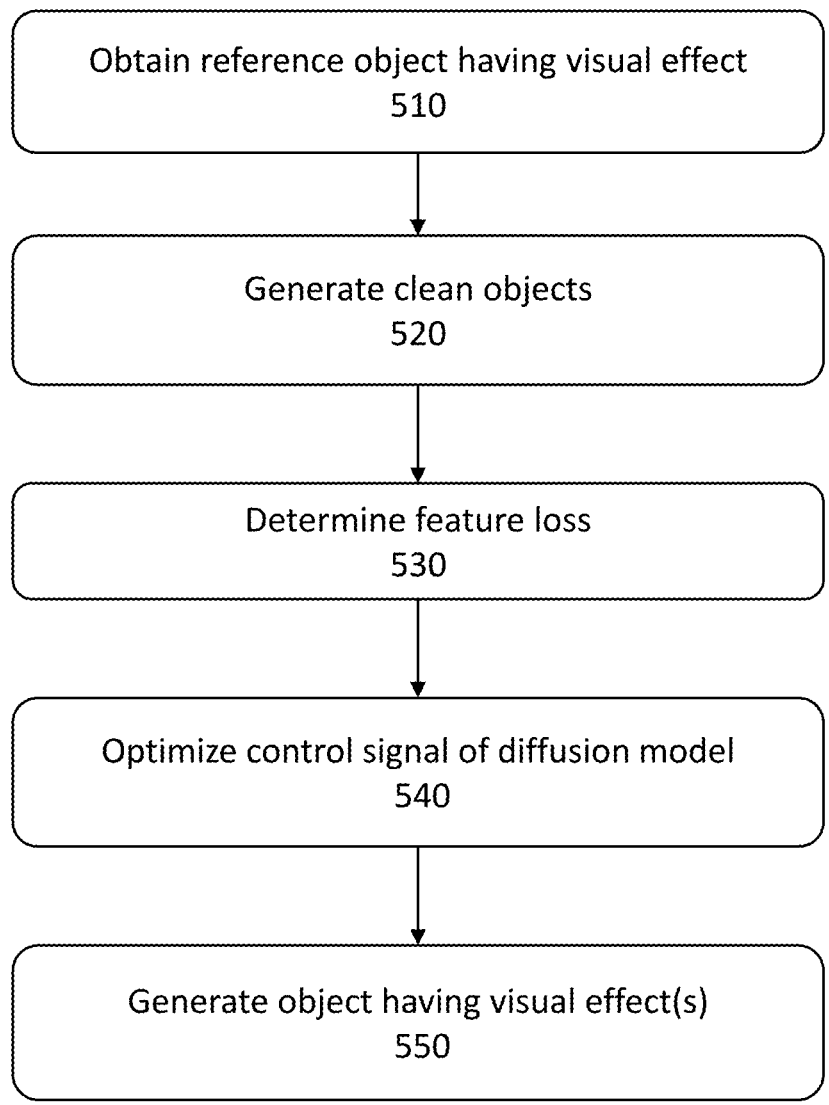
FIG. 5A is a flow chart illustrating an example processing flow of customizing a diffusion model to generate objects having a visual effect, in accordance with at least some embodiments described herein.

FIG. 5A is a flow chart illustrating an example processing flow of customizing a diffusion model to generate objects having a visual effect, in accordance with at least some embodiments described herein. It is to be understood that the processing flow 500 disclosed herein may be conducted by one or more processors (e.g., the central processor unit 705 of FIG. 7, or any other suitable processor), one or more components of FIG. 1, or one or more modules of FIG. 2, unless otherwise specified. The conducting processor may communicate with other components of the system 200 of FIG. 2.

It is also to be understood that the processing flow 500 may include one or more operations, actions, or functions as illustrated by one or more of blocks 510, 520, 530, 540, and 550. These various operations, functions, or actions may, for example, correspond to software, program code, or program instructions executable by a processor that causes the functions to be performed. Although illustrated as discrete blocks, obvious modifications may be made, e.g., two or more of the blocks may be re-ordered; further blocks may be added; and various blocks may be divided into additional blocks, combined into fewer blocks, or eliminated, depending on the desired implementation. Processing flow 500 may begin at block 510.

At block 510 (Obtain reference object having visual effect), the processor may obtain or receive a reference object having a predetermined visual effect from e.g., the source 210 of FIG. 2. In one example embodiment, the reference object can be obtained by manually editing an image to add the predetermined visual effect. In another example embodiment, the reference object with the target or reference visual effect can be generated using a generative model. It is to be understood that the process at block 510 may be implemented e.g., in the control logic 260 of the generator 220 of FIG. 2. Processing may proceed from block 510 to block 520.

At block 520 (Generate clean objects), the processor may generate one or more clean objects by performing a forward generation process of a diffusion model with a control signal. The control signal is configured to control a visual effect of the clean objects. In one example embodiments, the generating of the clean objects can include generating a final image after a completion of iteratively de-noising a starting noise by performing the forward generation process of the diffusion model. For example, the de-noising module 250 can perform the forward generation process 350 with the starting noise 320 to generate the final image 340, as shown in FIGS. 2 and 3. In one example embodiment, the diffusion model can be a pre-trained DPM (e.g., a text-to-image diffusion-based generative model) with a first input as a content conditioner and a second input as a visual effect conditioner to generate the clean objects. The visual effect conditioner may be represented as a text embedding as denoted as "#" in FIG. 5B. The text embedding can be combined (e.g., concatenated) with embeddings of other text prompts to generate the clean objects. For example, the diffusion model may receive a first text prompt (e.g., "a cute totoro in a yard") as a content conditioner and a second text prompt as a visual effect conditioner (e.g., "bokeh") to the pre-trained text-to-image diffusion-based generative model, and the corresponding embeddings can be concatenated to generate a clean image. The reference object and the clean objects may be obtained using the pre-trained text-to-image diffusion-based generative model with the same first input (e.g., "a cute totoro in a yard"). Processing may proceed from block 520 to block 530.

At block 530 (Determine feature loss), the processor may determine a feature loss of each clean object with respect to the reference object having the predetermined visual effect. The feature loss can measure the difference or distance between the visual effect of the clean objects and the predetermined visual effect of the reference object. The feature loss may be determined using any suitable loss functions such as, for example, a mean squared error (MSE) loss or L2 loss, or a perceptual loss. For example, the feature loss between a clean object and the reference object having the same content (e.g., "a cute puppy in a yard") can be determined by calculating a L2 loss. Processing may proceed from block 530 to block 540.

At block 540 (Optimize control signal of diffusion model), the processor may optimize the control signal by backpropagating a gradient of the feature loss with respect to the control signal to minimize the feature loss and to obtain a customized diffusion model with an optimized control signal. In one example embodiment, the feature loss can be minimized to optimize the text embedding "#" representing the visual effect conditioner. For example, the feature loss between one or more pairs of clean object and the corresponding reference object (e.g., "a cute puppy in a yard") can be minimized using backpropagation to optimize the text embedding "#" representing the visual effect conditioner (e.g., "bokeh"). In one example embodiment, the backpropagating of the gradient of the feature loss can be performed by solving an augmented adjoint ordinary differential equation (ODE) based on an adjoint sensitivity method (e.g., see the augmented adjoint ODE, Equation (3) as described above). The augmented adjoint ODE can be reparameterized to reduce the numerical error of solving the augmented adjoint ODE (e.g., see the reparameterized augmented adjoint ODE, Equation (4) as described above). Processing may proceed from block 540 to block 550.

At block 550 (Generate object having visual effect(s)), the processor may generate an object using the customized diffusion model with the optimized control signal. The generated object has a visual effect resembling (e.g., substantially the same as) the predetermined visual effect of the reference object. In one example embodiment, the customized diffusion model may be a pre-trained DPM (e.g., a text-to-image diffusion-based generative model) with an optimized text embedding "#" representing the visual effect conditioner (e.g., "bokeh"). The optimized text embedding allows the model to transfer the text prompt (e.g., "bokeh," as the visual effect conditioner) into the predetermined visual effect of the reference object.

Figure 5B:
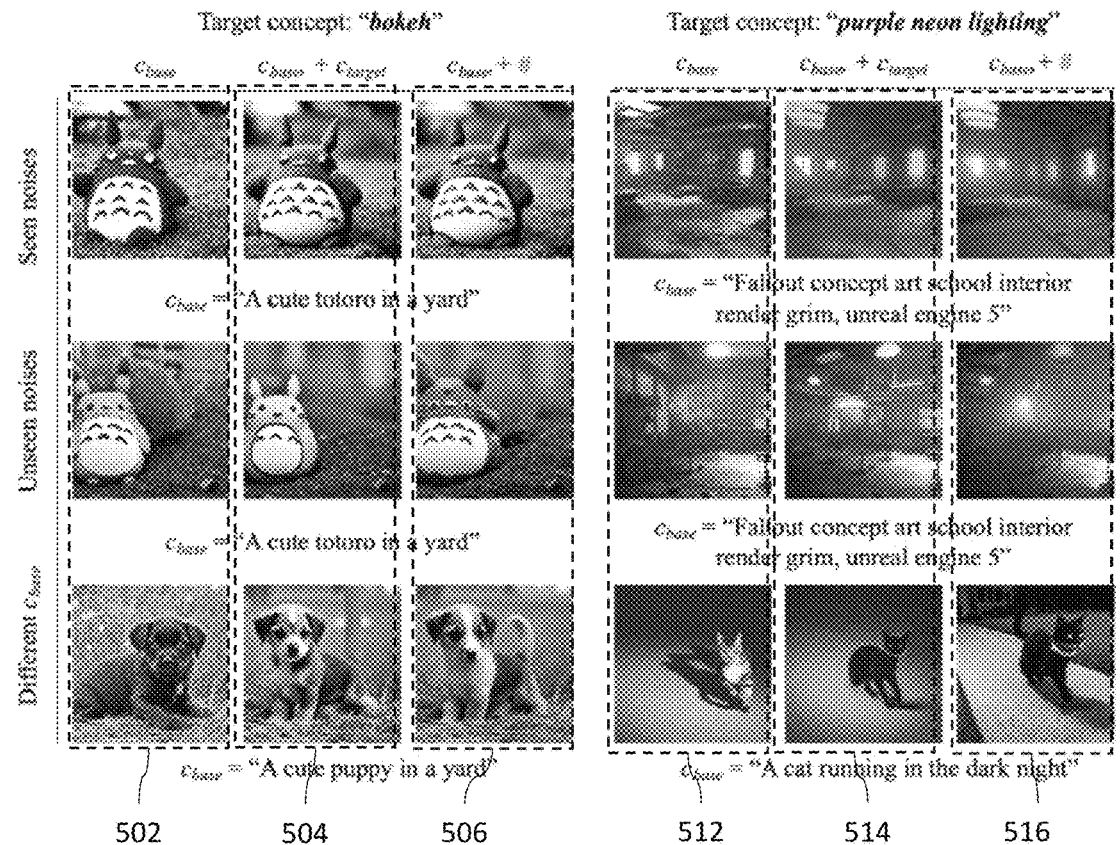
FIG. 5B illustrates an example process of generating objects having a visual effect using the customized diffusion model of FIG. 5A, arranged in accordance with at least some embodiments described herein.
Figure 5B:
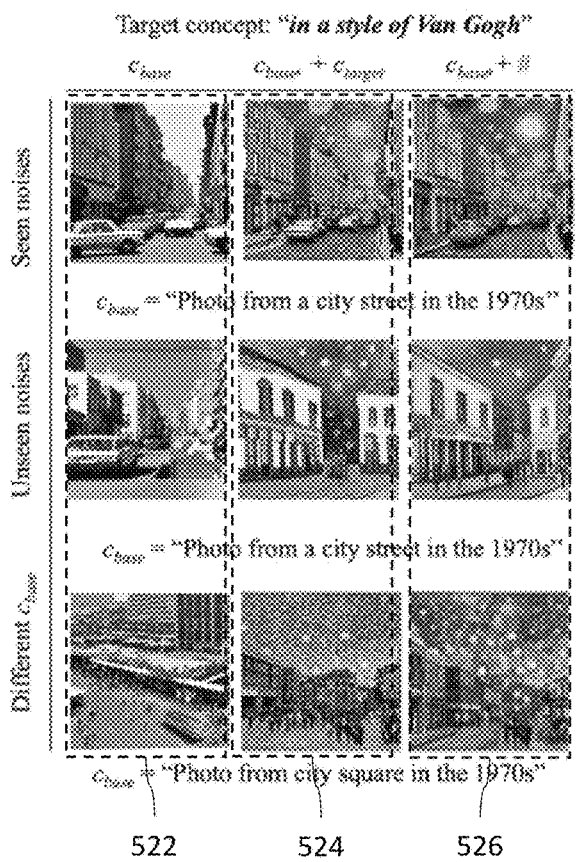

FIG. 5B illustrates an example process of generating objects having a visual effect using the customized diffusion model obtained by the processing flow 500 of FIG. 5A, arranged in accordance with at least some embodiments described herein. The customized diffusion model with the optimized control signal can generate objects having a visual effect resembling (e.g., substantially the same as) a predetermined target visual effect of a reference object.

The predetermined target visual effect may include any desired visual effects of an image such as, for example, a bokeh effect, a relighting effect, a style of VanGogh, a black and white effect, etc. The customized diffusion model described herein can combine the optimized control signal with various conditioning inputs or content conditioners (e.g., a text prompt) to generate objects with substantially the same visual effect.

In the embodiment depicted in FIG. 5B, images 502, 512, and 522 are generated using a diffusion model before optimizing the control signal, which may be a pre-trained DPM (e.g., a text-to-image diffusion-based generative model) with an input as a content conditioner (e.g., a text prompt). For example, a user may input a text prompt denoted as Chase as a content conditioner to the pre-trained text-to-image diffusion-based generative model to generate a content of an image consistent with the text prompt. For example, as shown in FIG. 5B, the images 502, 512, and 522 show various contents consistent with the respective text prompts such as "a cut totoro in a yard," "a cute puppy in a yard," "fallout concept art school interior render grim, unreal engine 5," "a cat running in the dark night," "photo from a city street in the 1970s," and "phot from city square in the 1970s."

A target or reference visual effect can be added to the generated images 502, 512, and 522 to form target or reference images 504, 514, and 524, respectively. For example, as shown in FIG. 5B, the target or reference visual effect denoted as $C_{target}$ may correspond to the visual effects of "bokeh," "purple neon lighting," and "in a style of Van Gogh." In an embodiment, the target or reference visual effect $C_{target}$ can be manually added to a target or reference image by editing an image. For example, the images 502, 512, and 522 can be edited by a professional photographer to add the one or more target or reference visual effects to improve the aesthetic quality including, e.g., color, tone, bokeh, etc. In another embodiment, images with the target or reference visual effect $C_{target}$ can be generated using a generative model by concatenating the text prompt Chase with an effect token corresponding to the target or reference visual effect $C_{target}$.

A target or reference visual effect can be distilled from the target or reference images 504, 514, and 524 by customizing a diffusion model with an optimized control signal using the processing flow 500 of FIG. 5A. For example, when a user inputs the text prompt Chase as a content conditioner as a content conditioner and the text prompt $C_{target}$ (e.g., "bokeh," "purple neon lighting," and "in a style of Van Gogh") as a control signal to the customized diffusion model, images 506, 516, and 526 are generated by the customized diffusion model, having the respective target or reference visual effects of the reference images 504, 514, and 524. It is to be understood that the customized diffusion model can generate objects having predetermined visual effect(s) regardless whether or not a content of the objects (e.g., "totoro") has been used for training or customizing the diffusion model (i.e., "different $C_{base}$"). It is also to be understood that customized diffusion model can generate stylized objects regardless whether or not a starting noise has been used for training or customizing the diffusion model (i.e., "seen noises" or "unseen noises"). For example, the "bokeh" effect can be distilled from a pair of "toroto" images 502 and 504 by customizing a diffusion model with an optimized control signal corresponding to the text prompt "bokeh." The distilled "bokeh" effect can be used for generating images 506 with various classes of content such as "totoro," "dog," etc. The generated images 506 have substantially the same "bokeh" effect as that in the target or reference image 504, as shown in FIG. 5B. Accordingly, the customized diffusion model with an optimized control signal can be used for novel scene generations.

Figure 6A:
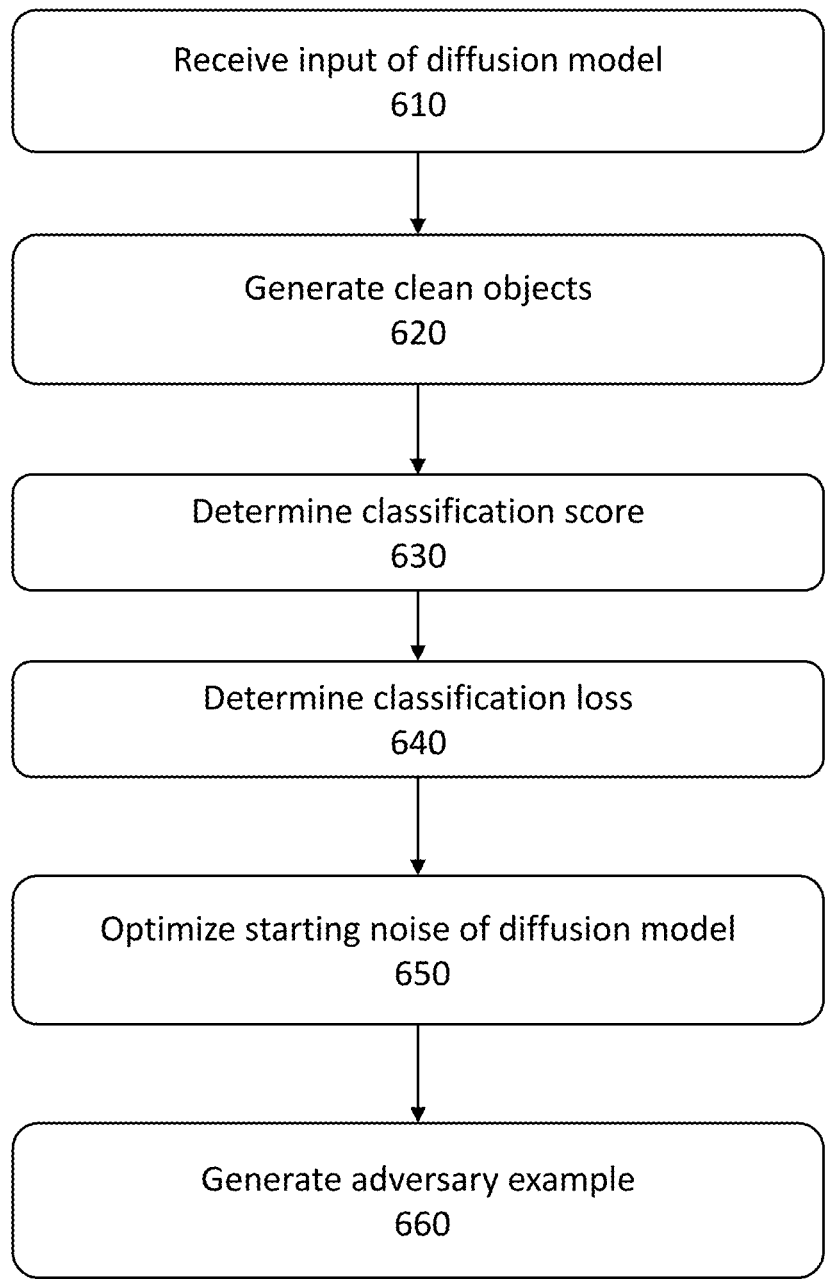
FIG. 6A is a flow chart illustrating an example processing flow of customizing a diffusion model to provide adversary examples to audit security of an object generation system, in accordance with at least some embodiments described herein.

FIG. 6A is a flow chart illustrating an example processing flow of customizing a diffusion model to provide adversary examples to audit security of an object generation system, in accordance with at least some embodiments described herein. It is to be understood that the processing flow 600 disclosed herein may be conducted by one or more processors (e.g., the central processor unit 705 of FIG. 7, or any other suitable processor), one or more components of FIG. 1, or one or more modules of FIG. 2, unless otherwise specified. The conducting processor may communicate with other components of the system 200 of FIG. 2.

It is also to be understood that the processing flow 600 may include one or more operations, actions, or functions as illustrated by one or more of blocks 610, 620, 630, 640, 650 and 660. These various operations, functions, or actions may, for example, correspond to software, program code, or program instructions executable by a processor that causes the functions to be performed. Although illustrated as discrete blocks, obvious modifications may be made, e.g., two or more of the blocks may be re-ordered; further blocks may be added; and various blocks may be divided into additional blocks, combined into fewer blocks, or eliminated, depending on the desired implementation. Processing flow 600 may begin at block 610.

At block 610 (Receive input of diffusion model), the processor may obtain or receive an input for a diffusion model from e.g., the source 210 of FIG. 2. It is to be understood that the process at block 410 may be implemented e.g., in the control logic 260 of the generator 220 of FIG. 2. The input may include a text prompt as a content conditioner and a starting noise having an adversarial perturbation. The text prompt may correspond to a reference class of content as identified by a classifier. The adversarial perturbation may be restricted to have a norm that is small enough such that the generated clean objects with the adversarial perturbation are visually similar to those without the adversarial perturbation. The norm for the adversarial perturbation may refer to the scale or magnitude of the change applied to the starting noise. It is to be understood that the choice of norm may depend on the specific implementation and requirements of the diffusion model. Processing may proceed from block 610 to block 620.

At block 620 (Generate clean objects), the processor may generate one or more clean objects by performing a forward generation process of a diffusion model with the input as a content conditioner and with a starting noise having a perturbation. For example, the diffusion model may receive a text prompt of "starfish" and perform the forward generation process 350 with the starting noise 320 having the adversarial perturbation to generate the clean object 340. When the adversarial perturbation is not applied, the diffusion model can generate a reference object by performing the forward generation process of the diffusion model with the text prompt (e.g., "starfish"). The reference object can be identified by the classifier as the reference class of content (e.g., "starfish"). Processing may proceed from block 620 to block 630.

At block 630 (Determine classification score), the processor may determine, via the classifier, a classification score for each of the clean objects. The classifier may refer to a model or algorithm that can assign labels or categories to input images based on a visual content of the input images. The classifier may provide a classification score for an input image that represents the confidence or likelihood of the input image belonging to each class. Higher scores may indicate a higher probability of the image belong to a specific class. That is, a classification score may be interpreted as a measure of the classifier's confidence in its prediction. Processing may proceed from block 630 to block 640.

At block 640 (Determine classification loss), the processor may determine a classification loss of the classification score with respect to a target class of content. The target class of content being different from the reference class of content. In one example embodiment, the classifier may be included by a content moderation filter which can automatically filter or moderate generated content to ensure compliance with certain guidelines, policies, or legal requirements. A classifier of the content moderation filter can categorize and/or label content into different classes or categories based on predefined criteria or rules. For example, a classifier can assign content to classes such as, e.g., safe, not safe, harmful, non-harmful, etc. The classification loss can measure the difference or distance between the classification score predicted or determined by the classifier and the target class of content (e.g., a "safe" class label according to a not-safe-for-work (NSFW) filter). The choice of classification loss function may depend on the specific problem and the nature of class probabilities. In one example embodiment, the classification loss function may include a cross-entropy loss, or an embedding similarity loss. Processing may proceed from block 640 to block 650.

At block 650 (Optimize starting noise of diffusion model), the processor may optimize the adversarial perturbation of the starting noise by backpropagating a gradient of the classification loss with respect to the adversarial perturbation to minimize the classification loss of the classification score and to obtain a customized diffusion model with an optimized starting noise having the optimized perturbation. In one example embodiment, the backpropagating of the gradient of the classification loss can be performed by solving an augmented adjoint ordinary differential equation (ODE) based on an adjoint sensitivity method (e.g., see the augmented adjoint ODE, Equation (3) as described above). The augmented adjoint ODE can be reparameterized to reduce the numerical error of solving the augmented adjoint ODE (e.g., see the reparameterized augmented adjoint ODE, Equation (4) as described above). Processing may proceed from block 650 to block 660.

At block 660 (Generate adversary example), the processor may generate an adversary example using the customized diffusion model with an optimized starting noise having the optimized adversarial perturbation. The adversary example is identified by the classifier as the target class of content. In one example embodiment, the customized diffusion model with the optimized starting noise may receive a text prompt (e.g., "a photograph of a naked man") as a content conditioner to generate an object (e.g., image 611 of FIG. 6B) as an adversary example, which may be used to audit security of an object generation system. For example, when a content moderation filter (e.g., an NSFW filter) receives the adversary example generated by the customized diffusion model, a classifier of the content moderation filter may incorrectly classify the adversary example (e.g., image 611 of FIG. 6B) as a safe class which should have been classified as a harmful class.

Figure 6B:
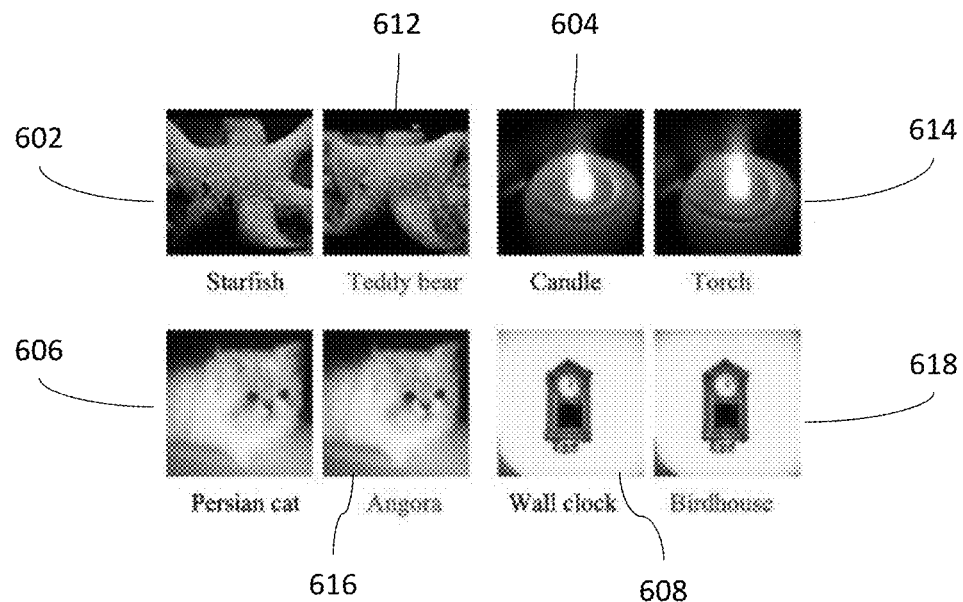
FIG. 6B illustrates adversary examples generated using the customized diffusion model of FIG. 6A and corresponding comparison examples, arranged in accordance with at least some embodiments described herein.
Figure 6B:
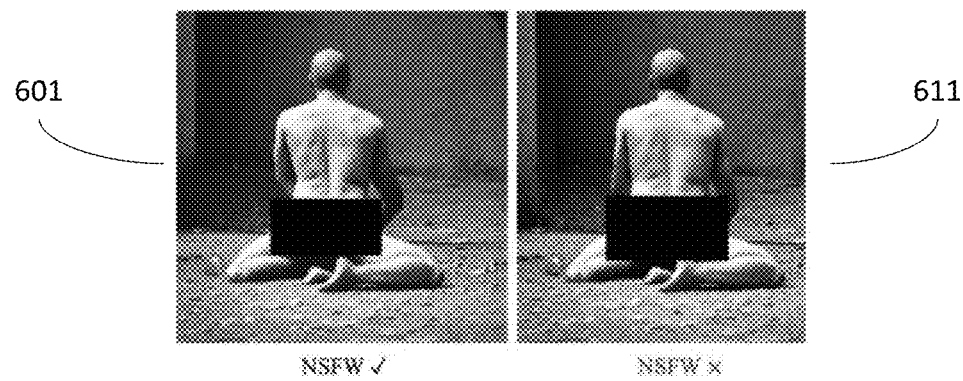

FIG. 6B illustrates adversary examples 611, 612, 614, 616, and 618 generated using the customized diffusion model of FIG. 6A and the corresponding comparison examples 601, 602, 604, 606, and 608, arranged in accordance with at least some embodiments described herein. The customized diffusion model with an optimized starting noise having an optimized perturbation can generate objects (e.g., an adversary example) that may mislead a classifier such as one included in a content moderation filter (e.g., an NSFW filter).

In the embodiment depicted in FIG. 6B, images 601, 602, 604, 606 and 608 are generated using a diffusion model before optimizing the starting noise thereof, which may be a pre-trained DPM (e.g., a text-to-image diffusion-based generative model) with an input as a content conditioner. For example, a user may input a text prompt (e.g., "a photograph of a naked man") as a content conditioner to the pre-trained text-to-image diffusion-based generative model to generate a content of an image (e.g., image 601) consistent with the text prompt.

A classifier can correctly classify the content of the generated images 601, 602, 604, 606 and 608. For example, the classifier correctly classifies the content of image 602 as "starfish," the content of image 604 as "candle," the content of image 606 as "Persian cat," the content of image 608 as "wall clock." The classifier may be included by a content moderation filter (e.g., a NSFW filter), which can correctly classify the content of image 601 as "harmful."

Images 611, 612, 614, 616 and 618 are generated by the customized diffusion model with an optimized starting noise having an optimized perturbation, with the same input (e.g., a content conditioner) as that for the corresponding images 601, 602, 604, 606 and 608. The images 611, 612, 614, 616 and 618 can be provided to the classifier as adversary examples that may mislead the classifier. For example, the classifier incorrectly classifies the content of image 612 as "Teddy bear" instead of "starfish," the content of image 614 as "torch" instead of "candle," the content of image 616 as "Angora" instead of "Persian cat," the content of image 618 as "birdhouse" instead of "wall clock." The content moderation filter (e.g., the NSFW filter) incorrectly classifies the content of image 611 as "safe" instead of "harmful."

Figure 7:
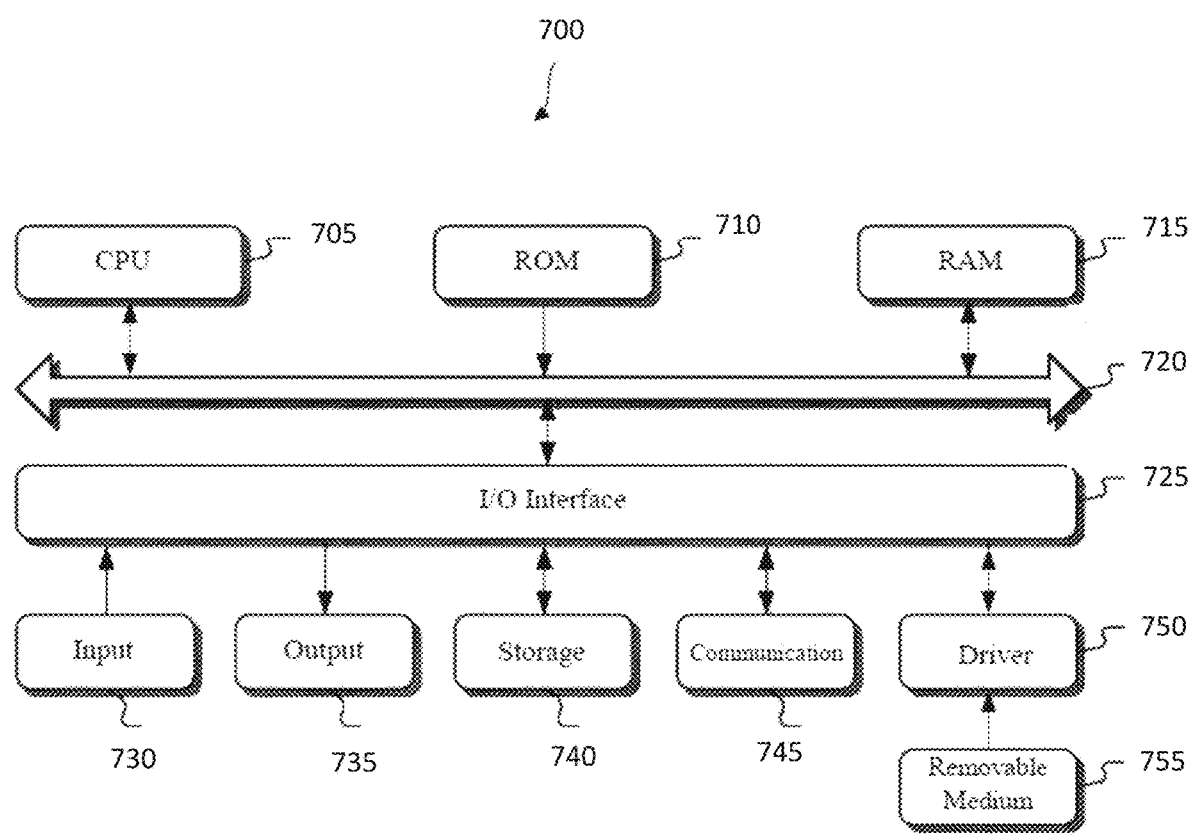
FIG. 7 is a schematic structural diagram of an example computer system applicable to implementing an electronic device, arranged in accordance with at least some embodiments described herein.

FIG. 7 is a schematic structural diagram of an example computer system 700 applicable to implementing an electronic device (for example, the devices 110, 120, 130, and 140, and the server 150 of FIG. 1, the source device 210 of FIG. 2, the device hosts, implements, executes, and/or stores the generator 220 of FIG. 2, etc.), arranged in accordance with at least some embodiments described herein. It is to be understood that the computer system shown in FIG. 7 is provided for illustration only instead of limiting the functions and applications of the embodiments described herein.

As depicted, the computer system 700 may include a central processing unit (CPU) 705. The CPU 705 may perform various operations and processing based on programs stored in a read-only memory (ROM) 710 or programs loaded from a storage device 740 to a random-access memory (RAM) 715. The RAM 715 may also store various data and programs required for operations of the system 700. The CPU 705, the ROM 710, and the RAM 715 may be connected to each other via a bus 720. An input/output (I/O) interface 725 may also be connected to the bus 720.

The components connected to the I/O interface 725 may further include an input device 730 including a keyboard, a mouse, a digital pen, a drawing pad, or the like; an output device 735 including a display such as a liquid crystal display (LCD), a speaker, or the like; a storage device 740 including a hard disk or the like; and a communication device 745 including a network interface card such as a LAN card, a modem, or the like. The communication device 745 may perform communication processing via a network such as the Internet, a WAN, a LAN, a LIN, a cloud, etc. In an embodiment, a driver 750 may also be connected to the I/O interface 725. A removable medium 755 such as a magnetic disk, an optical disk, a magneto-optical disk, a semiconductor memory, or the like may be mounted on the driver 750 as desired, such that a computer program read from the removable medium 755 may be installed in the storage device 740.

It is to be understood that the processes described with reference to the flowchart of FIGS. 4A, 5A, 6A, and/or described in other figures may be implemented as computer software programs. The computer program product may include a computer program stored in a computer readable non-volatile medium. The computer program includes program codes for performing the method shown in the flowchart and/or process. In this embodiment, the computer program may be downloaded and installed from the network via the communication device 745, and/or may be installed from the removable medium 755. The computer program, when being executed by the central processing unit (CPU) 705, can implement the above functions specified in the method in the embodiments disclosed herein.

It is also to be understood that features in the embodiments described herein may provide methods of optimizing one or more parameters (e.g., a conditioning/control signal, network weights, or an initial or starting noise) of a diffusion model to obtain a customized diffusion model. The customization can be based on a computable and differentiable metric evaluated on clean objects generated by performing a forward generation process of the diffusion model. The computable and differentiable metric can include, for example, a classifier, a difference/distance between a stylized Gram matrix, etc.

It is also to be understood that features in the embodiments described herein may provide methods of optimizing one or more parameters of the diffusion model by backpropagating a gradient of loss with respect to the one or more parameters to minimize the loss and to obtain a customized diffusion model with the optimized one or more parameters. Embodiments described herein provide a gradient backpropagation process which may store the intermediate state only at the time point of function evaluation, resulting in a constant memory usage.

As a comparison, when a diffusion model is customized using a naive gradient backpropagation, the customization process may require an intermediate state storage for all iterations, resulting in significant memory consumption. For example, as shown in FIG. 3, in the stochastic diffusion process, data distributions ($x_O$) are diffused into white Gaussian noise ($x_T$), and the stochastic diffusion process is reverted to synthesize new contents ($x_O$). A naive gradient backpropagation requires intermediate state storage for all iterations ($X_k$: T operations or iterations ($x_O \to x_T$)).

In addition, the customization process using the naive gradient backpropagation may require multiple reference examples to align a pre-trained diffusion model with user-provided concepts. Otherwise, the resultant output image of the customized model may be constrained by the content of the input images. For example, users may customize a commercially available diffusion model (e.g., a pre-trained DPM) to generate desired images. Such a customization of the diffusion model (e.g., the pre-trained DPM) using the naive gradient backpropagation may require multiple reference examples having the same desired style, e.g., multiple images of Vincent van Gogh paintings, as an input to customize parameters of the pre-trained diffusion model such that the pre-trained diffusion model with the customized parameters can generate images having a style of Vincent van Gogh paintings. However, when the number of the input images having the desired style is limited, the resultant output image may not only appear to have the style of Vincent van Gogh paintings, but also be constrained by the content of the input images. For example, when a Vincent van Gogh painting of "sunflower" is used as an input, the customized model may generate images having the content limited to that of the input image, e.g., sunflower.

It is to be understood that the disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., a field programmable gate array, an application specific integrated circuit, or the like.

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

It is to be understood that different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by both this disclosure. It is indeed intended that the scope of this disclosure should be determined by a proper legal interpretation and construction of the disclosure, including equivalents, as understood by those of skill in the art relying upon the complete disclosure present at the time of filing.

Aspects:

It is appreciated that any one of aspects can be combined with each other.

Aspect 1. A method for generating a stylized object using a diffusion model, the method comprising:
  obtaining a reference style representation of a reference object;
  generating one or more objects by performing a forward generation process of the diffusion model;
  determining a style loss of each of the objects with respect to the reference object;
  optimizing network weights of the diffusion model by backpropagating a gradient of the style loss with respect to the network weights to minimize the style loss and to obtain a customized diffusion model with the optimized network weights; and
  generating the stylized object using the customized diffusion model with the optimized network weights, the stylized object having a style resembling the style of the reference object.

Aspect 2. The method of Aspect 1, wherein the generating of the objects includes generating a final image after a completion of iteratively de-noising a starting noise by performing the forward generation process of the diffusion model.

Aspect 3. The method of Aspect 1 or 2, wherein the diffusion model is a pre-trained text-to-image diffusion-based generative model with an input as a content conditioner to generate the objects.

Aspect 4. The method of Aspect 3, wherein the optimizing of the network weights further comprises minimizing a combination of the style loss and a content loss, the content loss corresponding to features of the objects generated by the pre-trained text-to-image diffusion-based generative model with the content conditioner.

Aspect 5. The method of Aspect 3 or 4, wherein the optimizing of the network weights further comprises optimizing one or more parameters of the pre-trained text-to-image diffusion-based generative model.

Aspect 6. The method of any one of Aspects 1-5, wherein the backpropagating of the gradient of the style loss is performed by solving an augmented adjoint ordinary differential equation (ODE) based on an adjoint sensitivity method.

Aspect 7. The method of Aspect 6, further comprising reparameterizing the augmented adjoint ODE.

Aspect 8. A method for generating an object with a visual effect using a diffusion model, the method comprising:
  obtaining a reference object having a predetermined visual effect;
  generating one or more objects by performing a forward generation process of a diffusion model with a control signal, the control signal being configured to control a visual effect of the generated objects;
  determining a feature loss of each of the objects with respect to the reference object having the predetermined visual effect;
  optimizing the control signal by backpropagating a gradient of the feature loss with respect to the control signal to minimize the feature loss and to obtain a customized diffusion model with an optimized control signal; and
  generating the object using the customized diffusion model with the optimized control signal, the object having a visual effect resembling the predetermined visual effect of the reference object.

Aspect 9. The method of Aspect 8, wherein the generating of the objects includes generating a final image after a completion of iteratively de-noising a starting noise by performing the forward generation process of the diffusion model.

Aspect 10. The method of Aspect 8 or 9, wherein the diffusion model is a pre-trained text-to-image diffusion-based generative model with a first input as a content conditioner and a second input as a visual effect conditioner to generate the objects.

Aspect 11. The method of Aspect 10, wherein the reference object is obtained using the pre-trained text-to-image diffusion-based generative model with the same first input.

Aspect 12. The method of Aspect 10 or 11, wherein the control signal of the diffusion model is optimized to transfer the second input into the visual effect.

Aspect 13. The method of any one of Aspects 8-12, wherein the backpropagating of the gradient of the feature loss is performed by solving an augmented adjoint ordinary differential equation (ODE) based on an adjoint sensitivity method.

Aspect 14. The method of Aspect 13, further comprising reparameterizing the augmented adjoint ODE.

Aspect 15. A method for providing adversary examples to audit security of an object generation system, the method comprising:
  generating one or more objects by performing a forward generation process of a diffusion model with an input as a content conditioner and with a starting noise having a perturbation, the input corresponding to a reference class of content as identified by a classifier;
  determining, via the classifier, a classification score for each of the objects;

determining a classification loss of the classification score with respect to a target class of content, the target class of content being different from the reference class of content;

optimizing the perturbation of the starting noise by backpropagating a gradient of the classification loss with respect to the perturbation to minimize the classification loss of the classification score and to obtain a customized diffusion model with an optimized starting noise; and generating an adversary example using the customized diffusion model with the optimized starting noise, the adversary example being identified by the classifier as the target class of content.

Aspect 16. The method of Aspect 15, wherein the generating of the objects includes generating a final image after a completion of iteratively de-noising the starting noise by performing the forward generation process of the diffusion model.

Aspect 17. The method of Aspect 15 or 16, further comprising generating a reference object by performing the forward generation process of the diffusion model with the input as the content conditioner, the reference object being identified by the classifier as the reference class of content.

Aspect 18. The method of any one of Aspects 15-17, wherein the classifier includes a content moderation filter.

Aspect 19. The method of Aspect 18, wherein the content moderation filter clarifies the adversary example as a safe class which should have been classified as a harmful class.

Aspect 20. The method of any one of Aspects 15-19, wherein the backpropagating of the gradient of the classification loss is performed by solving an augmented adjoint ordinary differential equation (ODE) based on an adjoint sensitivity method.

Aspect 21. The method of Aspect 20, further comprising reparameterizing the augmented adjoint ODE.

Aspect 22. A method of customizing a diffusion model to obtain a customized model, the method comprising:

generating one or more objects by performing a forward generation process of the diffusion model;

determining a loss of each of the objects with respect to a reference metric; and optimizing one or more parameters of the diffusion model by backpropagating a gradient of the loss with respect to the one or more parameters to minimize the loss and to obtain the customized model with the optimized one or more parameters.

Aspect 23. The method of Aspect 22, wherein the loss includes a style loss, a feature loss, or a classification loss.

Aspect 24. The method of Aspect 22 or 23, wherein the reference metric includes a style representation, a visual effect, or a class of content according to a classifier.

Aspect 25. The method of Aspect 24, wherein the style representation includes a Gram matrix.

Aspect 26. The method of any one of Aspects 22-25, wherein the one or more parameters include network weights, a control signal, or a starting noise.

Aspect 27. The method of any one of Aspects 22-26, wherein the backpropagating of the gradient of the loss is performed by solving an augmented adjoint ordinary differential equation (ODE) based on an adjoint sensitivity method.

Aspect 28. The method of Aspect 27, further comprising reparameterizing the augmented adjoint ODE.

Aspect 29. A non-transitory computer-readable medium having computer-executable instructions stored thereon that, upon execution, cause one or more processors to perform operations comprising:

generating one or more objects by performing a forward generation process of a diffusion model;

determining a loss of each of the objects with respect to a reference metric; and optimizing one or more parameters of the diffusion model by backpropagating a gradient of the loss with respect to the one or more parameters to minimize the loss and to obtain a customized model with the optimized one or more parameters.

Aspect 30. A generator for generating an object using a diffusion model, the generator comprising:

the diffusion model to generate one or more objects by performing a forward generation process; and a control logic module to:
determine a loss of each of the objects with respect to a reference metric; and
optimize one or more parameters of the diffusion model by backpropagating a gradient of the loss with respect to the one or more parameters to minimize the loss and to obtain a customized model with the optimized one or more parameters.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A method for providing adversary examples to audit security of an object generation system, the method comprising:

generating one or more objects by performing a forward generation process of a diffusion model with an input as a content conditioner and with a starting noise having a perturbation, the input corresponding to a reference class of content as identified by a classifier;

determining, via the classifier, a classification score for each of the objects;

determining a classification loss of the classification score with respect to a target class of content, the target class of content being different from the reference class of content;

optimizing the perturbation of the starting noise by backpropagating a gradient of the classification loss with respect to the perturbation to minimize the classification loss of the classification score and to obtain a customized diffusion model with an optimized starting noise; and generating an adversary example using the customized diffusion model with the optimized starting noise, the adversary example being identified by the classifier as the target class of content.

2. The method of claim 1, wherein the generating of the objects includes generating a final image after a completion of iteratively de-noising the starting noise by performing the forward generation process of the diffusion model.

3. The method of claim 1, further comprising generating a reference object by performing the forward generation process of the diffusion model with the input as the content conditioner, the reference object being identified by the classifier as the reference class of content.

4. The method of claim 1, wherein the classifier includes a content moderation filter.

5. The method of claim 4, wherein the content moderation filter clarifies the adversary example as a safe class which should have been classified as a harmful class.

6. The method of claim 1, wherein the backpropagating of the gradient of the classification loss is performed by solving an augmented adjoint ordinary differential equation (ODE) based on an adjoint sensitivity method.

7. One or more computer-readable storage medium storing one or more instructions that, when executable by one or more computers, cause the one or more computers to perform operations for providing adversary examples to audit security of an object generation system, the operations comprising:

generating one or more objects by performing a forward generation process of a diffusion model with an input as a content conditioner and with a starting noise having a perturbation, the input corresponding to a reference class of content as identified by a classifier;

determining, via the classifier, a classification score for each of the objects;

determining a classification loss of the classification score with respect to a target class of content, the target class of content being different from the reference class of content;

optimizing the perturbation of the starting noise by backpropagating a gradient of the classification loss with respect to the perturbation to minimize the classification loss of the classification score and to obtain a customized diffusion model with an optimized starting noise; and generating an adversary example using the customized diffusion model with the optimized starting noise, the adversary example being identified by the classifier as the target class of content.

8. The medium of claim 7, wherein the generating of the objects includes generating a final image after a completion of iteratively de-noising the starting noise by performing the forward generation process of the diffusion model.

9. The medium of claim 7, the operations further comprising generating a reference object by performing the forward generation process of the diffusion model with the input as the content conditioner, the reference object being identified by the classifier as the reference class of content.

10. The medium of claim 7, wherein the classifier includes a content moderation filter.

11. The medium of claim 10, wherein the content moderation filter clarifies the adversary example as a safe class which should have been classified as a harmful class.

12. The medium of claim 7, wherein the backpropagating of the gradient of the classification loss is performed by solving an augmented adjoint ordinary differential equation (ODE) based on an adjoint sensitivity method.

13. A computer-implemented system, comprising:
one or more computers; and
one or more computer memory devices interoperably coupled with the one or more computers and having computer-readable storage media storing one or more instructions that, when executed by the one or more computers, perform one or more operations providing adversary examples to audit security of an object generation system, the operations comprising:

generating one or more objects by performing a forward generation process of a diffusion model with an input as a content conditioner and with a starting noise having a perturbation, the input corresponding to a reference class of content as identified by a classifier;

determining, via the classifier, a classification score for each of the objects;

determining a classification loss of the classification score with respect to a target class of content, the target class of content being different from the reference class of content;

optimizing the perturbation of the starting noise by backpropagating a gradient of the classification loss with respect to the perturbation to minimize the classification loss of the classification score and to obtain a customized diffusion model with an optimized starting noise; and generating an adversary example using the customized diffusion model with the optimized starting noise, the adversary example being identified by the classifier as the target class of content.

14. The system of claim 13, wherein the generating of the objects includes generating a final image after a completion of iteratively de-noising the starting noise by performing the forward generation process of the diffusion model.

15. The system of claim 13, the operations further comprising generating a reference object by performing the forward generation process of the diffusion model with the input as the content conditioner, the reference object being identified by the classifier as the reference class of content.

16. The system of claim 13, wherein the classifier includes a content moderation filter.

17. The system of claim 16, wherein the content moderation filter clarifies the adversary example as a safe class which should have been classified as a harmful class.

18. The system of claim 13, wherein the backpropagating of the gradient of the classification loss is performed by solving an augmented adjoint ordinary differential equation (ODE) based on an adjoint sensitivity method.

* * * * *